(12) United States Patent
Tsuruta et al.

(10) Patent No.: US 7,665,226 B2
(45) Date of Patent: Feb. 23, 2010

(54) METHOD FOR DRYING UNDER REDUCED PRESSURE USING MICROWAVES

(75) Inventors: Takaharu Tsuruta, Kitakyushu (JP); Tadahisa Hayashi, Onga-gun (JP)

(73) Assignees: Kitakyushu Foundation for the Advancement of Industry, Science & Technology, Kitakyushu-shi (JP); Fukuoka Prefectural Government, Fukuoka-shi (JP)

(*) Notice: Subject to any disclaimer, the term of this patent is extended or adjusted under 35 U.S.C. 154(b) by 520 days.

(21) Appl. No.: 11/547,915

(22) PCT Filed: Apr. 11, 2005

(86) PCT No.: PCT/JP2005/007042

§ 371 (c)(1),
(2), (4) Date: Oct. 10, 2006

(87) PCT Pub. No.: WO2005/100891

PCT Pub. Date: Oct. 27, 2005

(65) Prior Publication Data

US 2007/0271811 A1    Nov. 29, 2007

(30) Foreign Application Priority Data

Apr. 12, 2004   (JP)   ............................ 2004-117116

(51) Int. Cl.
*F26B 5/06*   (2006.01)

(52) U.S. Cl. ........................... 34/259; 34/265; 219/688; 219/730

(58) Field of Classification Search ................... 34/259, 34/260, 261, 262, 263, 264, 265; 219/688, 219/730

See application file for complete search history.

(56) References Cited

U.S. PATENT DOCUMENTS 3,474,209 A * 10/1969 Parker ......................... 219/696
3,753,651 A *  8/1973 Boucher ....................... 422/21

(Continued)

FOREIGN PATENT DOCUMENTS

CN          1121580 A    5/1996

(Continued)

OTHER PUBLICATIONS

International Search Report of PCT/JP2005/007042, date of mailing Jun. 21, 2005.

(Continued)

*Primary Examiner*—Stephen M. Gravini
(74) *Attorney, Agent, or Firm*—Westerman, Hattori, Daniels & Adrian, LLP

(57) ABSTRACT

An apparatus and a method for drying under reduced pressure using microwaves. The apparatus comprises a chamber (13) for housing an object (11), a depressurizing pump (22) connected to the chamber (13) for depressurizing the inside of the chamber (13), a microwave irradiating device (12) for irradiating microwaves to the object (11) in the chamber (13), an airflow generating device for generating an airflow in the chamber (13) by introducing a gas from the outside to the inside of the chamber (13), and a control device (35) for controlling the above components. The object (11) in the chamber (13) is dried at temperatures below a deterioration temperature of the object (11) by intermittent irradiation of the microwaves under reduced pressure while the airflow is generated around the object (11).

7 Claims, 18 Drawing Sheets

U.S. PATENT DOCUMENTS

| | | | | |
|---|---|---|---|---|
| 3,839,616 | A * | 10/1974 | Risman | 219/707 |
| 4,250,628 | A * | 2/1981 | Smith et al. | 34/260 |
| 4,313,786 | A * | 2/1982 | Smith | 159/22 |
| 4,330,946 | A * | 5/1982 | Courneya | 34/263 |
| 4,510,169 | A * | 4/1985 | Linner | 427/4 |
| 4,567,847 | A * | 2/1986 | Linner | 118/50.1 |
| 4,640,020 | A * | 2/1987 | Wear et al. | 34/263 |
| 4,676,070 | A * | 6/1987 | Linner | 62/64 |
| 4,742,690 | A * | 5/1988 | Linner | 62/264 |
| 4,745,771 | A * | 5/1988 | Linner et al. | 62/264 |
| 4,799,361 | A * | 1/1989 | Linner | 435/1.3 |
| 4,856,203 | A * | 8/1989 | Wennerstrum | 34/68 |
| 4,865,871 | A * | 9/1989 | Livesey et al. | 435/1.3 |
| 4,911,805 | A * | 3/1990 | Ando et al. | 204/164 |
| 4,950,642 | A * | 8/1990 | Okamoto et al. | 505/477 |
| 5,020,237 | A * | 6/1991 | Gross et al. | 34/265 |
| 5,024,830 | A * | 6/1991 | Linner | 435/40.52 |
| 5,135,122 | A * | 8/1992 | Gross et al. | 219/685 |
| 5,174,042 | A * | 12/1992 | Tomizawa et al. | 34/259 |
| 5,191,182 | A * | 3/1993 | Gelorme et al. | 219/696 |
| 5,294,763 | A * | 3/1994 | Chamberlain et al. | 219/729 |
| 5,341,576 | A * | 8/1994 | Tsutomu et al. | 34/263 |
| 5,357,086 | A * | 10/1994 | Turpin et al. | 219/732 |
| 5,396,715 | A * | 3/1995 | Smith | 34/261 |
| 5,407,641 | A * | 4/1995 | Katschnig et al. | 422/107 |
| 5,411,592 | A * | 5/1995 | Ovshinsky et al. | 118/718 |
| 5,446,270 | A * | 8/1995 | Chamberlain et al. | 219/730 |
| 5,534,998 | A * | 7/1996 | Eastgate et al. | 356/316 |
| 5,555,642 | A * | 9/1996 | Rem et al. | 34/423 |
| 5,609,830 | A * | 3/1997 | Maihofer | 422/112 |
| 5,675,909 | A * | 10/1997 | Pare | 34/265 |
| 5,680,712 | A | 10/1997 | Kiyokawa et al. | |
| 5,732,476 | A * | 3/1998 | Pare | 34/265 |
| 5,763,877 | A * | 6/1998 | Oishi et al. | 250/288 |
| 5,837,978 | A * | 11/1998 | Hatzakis et al. | 219/702 |
| 5,858,178 | A * | 1/1999 | Lautenschlager | 203/73 |
| 5,884,417 | A * | 3/1999 | Pare | 34/263 |
| 5,886,326 | A * | 3/1999 | Tang | 219/679 |
| 5,904,553 | A * | 5/1999 | Passlack et al. | 438/590 |
| 5,974,687 | A * | 11/1999 | Gante et al. | 34/265 |
| 5,980,962 | A * | 11/1999 | Bracken et al. | 426/241 |
| 6,097,019 | A * | 8/2000 | Lewis et al. | 219/750 |
| 6,128,831 | A * | 10/2000 | Durance et al. | 34/412 |
| 6,150,645 | A * | 11/2000 | Lewis et al. | 219/715 |
| 6,225,611 | B1 * | 5/2001 | Pearcy et al. | 219/679 |
| 6,534,420 | B2 * | 3/2003 | Ahn et al. | 438/768 |
| 6,635,124 | B1 * | 10/2003 | Stowell et al. | 148/277 |
| 6,646,241 | B1 * | 11/2003 | Varma et al. | 219/679 |
| 6,701,637 | B2 * | 3/2004 | Lindsay et al. | 34/71 |
| 6,756,085 | B2 * | 6/2004 | Waldfried et al. | 427/515 |
| 6,889,447 | B2 * | 5/2005 | Lee et al. | 34/403 |
| 6,900,421 | B2 * | 5/2005 | Varma | 219/679 |
| 6,967,315 | B2 * | 11/2005 | Centanni et al. | 219/628 |
| 6,987,253 | B2 * | 1/2006 | Bedingham et al. | 219/752 |
| 7,164,107 | B2 * | 1/2007 | Bedingham et al. | 219/752 |
| 7,191,547 | B2 * | 3/2007 | Wiedl et al. | 34/264 |
| 7,435,933 | B2 * | 10/2008 | Bedingham et al. | 219/752 |
| 7,445,671 | B2 * | 11/2008 | Sunkara et al. | 117/40 |
| 7,454,893 | B2 * | 11/2008 | Bossmann et al. | 60/202 |
| 7,488,683 | B2 * | 2/2009 | Kobayashi et al. | 438/681 |
| 2002/0152630 | A1 * | 10/2002 | Lindsay et al. | 34/111 |
| 2005/0242091 | A1 * | 11/2005 | Bedingham et al. | 219/752 |
| 2006/0076346 | A1 * | 4/2006 | Bedingham et al. | 219/725 |
| 2006/0081624 | A1 * | 4/2006 | Takada et al. | 219/716 |
| 2006/0150436 | A1 * | 7/2006 | Tada et al. | 34/402 |
| 2007/0095823 | A1 * | 5/2007 | Sedlmayr | 219/688 |
| 2007/0114229 | A1 * | 5/2007 | Bedingham et al. | 219/752 |
| 2007/0215611 | A1 * | 9/2007 | O'Hagan et al. | 219/730 |
| 2007/0271811 | A1 * | 11/2007 | Tsuruta et al. | 34/263 |
| 2008/0000892 | A1 * | 1/2008 | Hirano et al. | 219/433 |
| 2008/0041925 | A1 * | 2/2008 | Cambay | 229/120.08 |
| 2008/0314895 | A1 * | 12/2008 | Bedingham et al. | 219/752 |
| 2009/0077825 | A1 * | 3/2009 | Toofan et al. | 34/273 |

FOREIGN PATENT DOCUMENTS

| | | |
|---|---|---|
| DE | 19848558 A1 | 4/2000 |
| JP | 4-83573 A | 3/1992 |
| JP | 7-208862 A | 8/1995 |
| JP | 11-83311 A | 3/1999 |
| JP | 2003-265896 A | 9/2003 |
| KR | 1995-0003630 U | 4/1991 |

OTHER PUBLICATIONS

Chinese Office Action dated Jul. 11, 2008, issued in corresponding Chinese Patent Application No. 200580013986.5.

* cited by examiner (A)

(B)

METHOD FOR DRYING UNDER REDUCED PRESSURE USING MICROWAVES

TECHNICAL FIELD

The present invention relates to a method and an apparatus for reduced pressure drying an object which is deteriorated depending on temperature using microwave irradiation. The deterioration of the object means substantial change in its constituents, deformation, etc.

BACKGROUND ART

Foodstuffs such as scallop adductor muscles and abalones are conventionally dried by being exposed to the sun for about three months. Dried vegetables used in health foods and instant foods are produced by crushing raw vegetables and then drying the vegetable pieces alone or the vegetable pieces mixed with water in a temperature range of 100 to 200° C. Japanese Patent Application Publication No. 7-208862 discloses a vacuum electromagnetic heating dryer. According to the invention disclosed in the publication, an article to be dried (an object) is placed in a pressure-resistant container, the inside of the pressure-resistant container is depressurized, and microwaves are irradiated to the object to heat water molecules therein, thereby drying the object.

However, in the case of sun-drying the foodstuffs, there have been problems of poor yields due to generation of mold and an increase in personnel costs. Moreover, drying the vegetables at high temperatures causes decompositions of vitamins and the like. Furthermore, pursuant to the Japanese Patent Application. Publication No. 7-208862, although depressurization allows the object to be dried at low temperatures, the microwaves are continuously irradiated to the object. Consequently, much heat is applied to the object, causing the object to be deteriorated or even burned in some cases.

Especially when drying food, the use of microwaves allows the drying to be completed in a short time. However, protein and starch are deteriorated by heating even at relatively low temperatures, resulting in changes in constituents of the food. When drying laundry with microwaves, the temperature thereof becomes excessively high, thereby damaging cloth of the laundry or causing the laundry to shrink. When drying lumber using microwaves, inner cellulose is deteriorated, which may hinder the natural properties of the lumber. Moreover, when drying electrical equipment by heating, elements and materials thereof are deteriorated or deformed depending on the heating temperature, which may result in damage of the equipment itself.

DISCLOSURE OF INVENTION

The present invention has been made to overcome the above disadvantages of the prior arts and aims to provide a method and an apparatus for drying an object under reduced pressure using microwaves, operable to dry the object in a short period of time at low temperatures at which the object does not deteriorate.

To attain the above object, the present invention provides a method for drying under reduced pressure using microwaves, comprising: placing an object in a chamber connected to a depressurizing pump; and irradiating the microwaves to the object while maintaining an inside of the chamber under reduced pressure, wherein a) the inside of the chamber is depressurized to or below a saturated vapor pressure corresponding to a deterioration temperature of the object; b) a gas is supplied from an outside to the inside of the chamber; and c) the object is dried while a temperature of the object is maintained below the deterioration temperature of the object by intermittent irradiation of the microwaves.

To attain the above object, the present invention also provides an apparatus for drying under reduced pressure using microwaves, comprising: a chamber for housing an object; a depressurizing pump connected to the chamber and provided for depressurizing an inside of the chamber; a microwave irradiating device for irradiating the microwaves to the object in the chamber; an airflow generating device for generating an airflow in the chamber by supplying a gas from an outside to the inside of the chamber; and a control device for controlling intermittent irradiation of the microwaves in a manner that the microwaves are irradiated to the object from the microwave irradiating device in a predetermined cycle, thereby maintaining a temperature of the object below a deterioration temperature of the object.

BEST MODE FOR CARRYING OUT THE INVENTION

Figure 1:
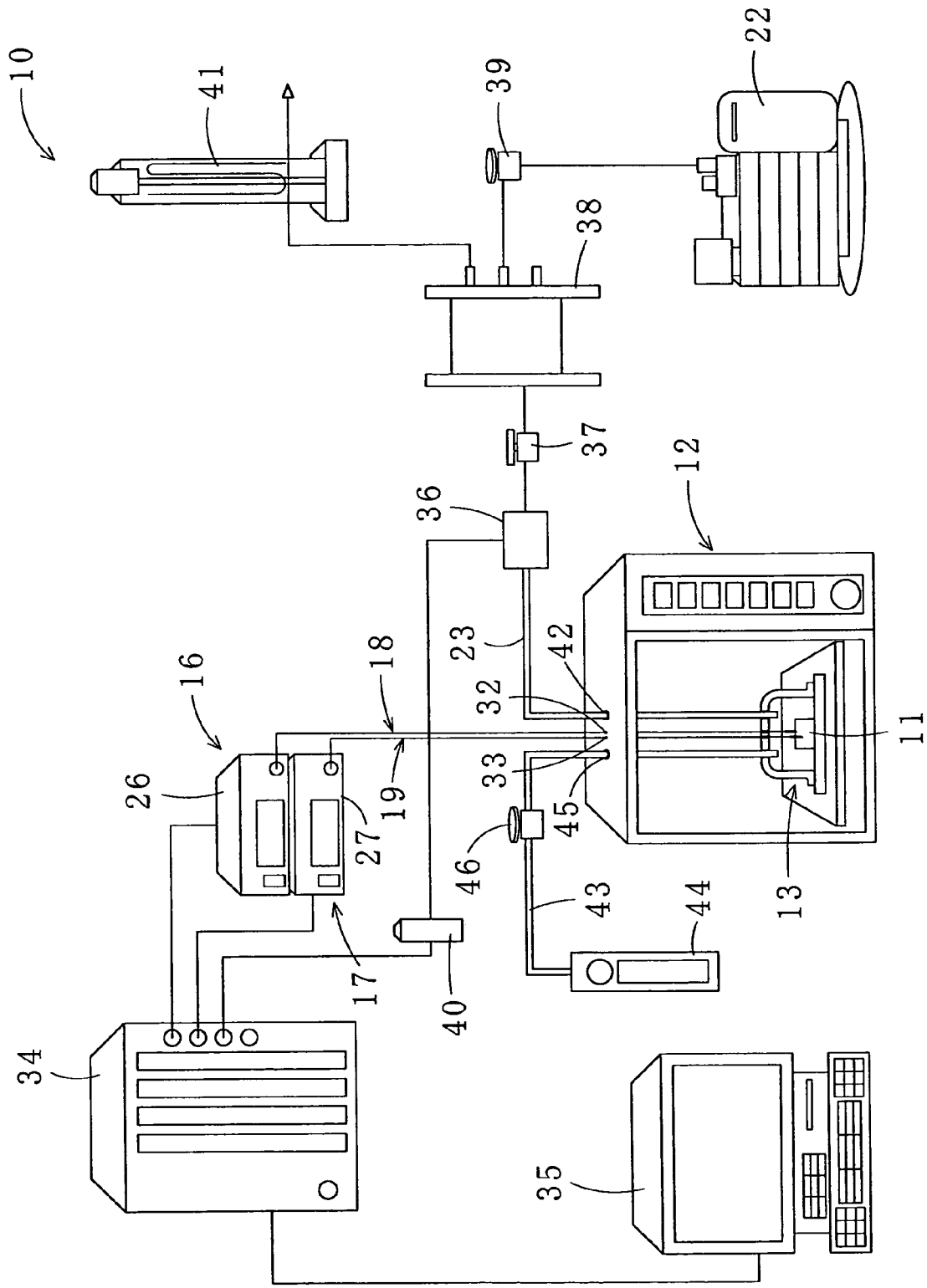
FIG. 1 is an explanatory diagram of an apparatus for drying under reduced pressure using microwaves according to a first embodiment of the present invention.
Figure 2:
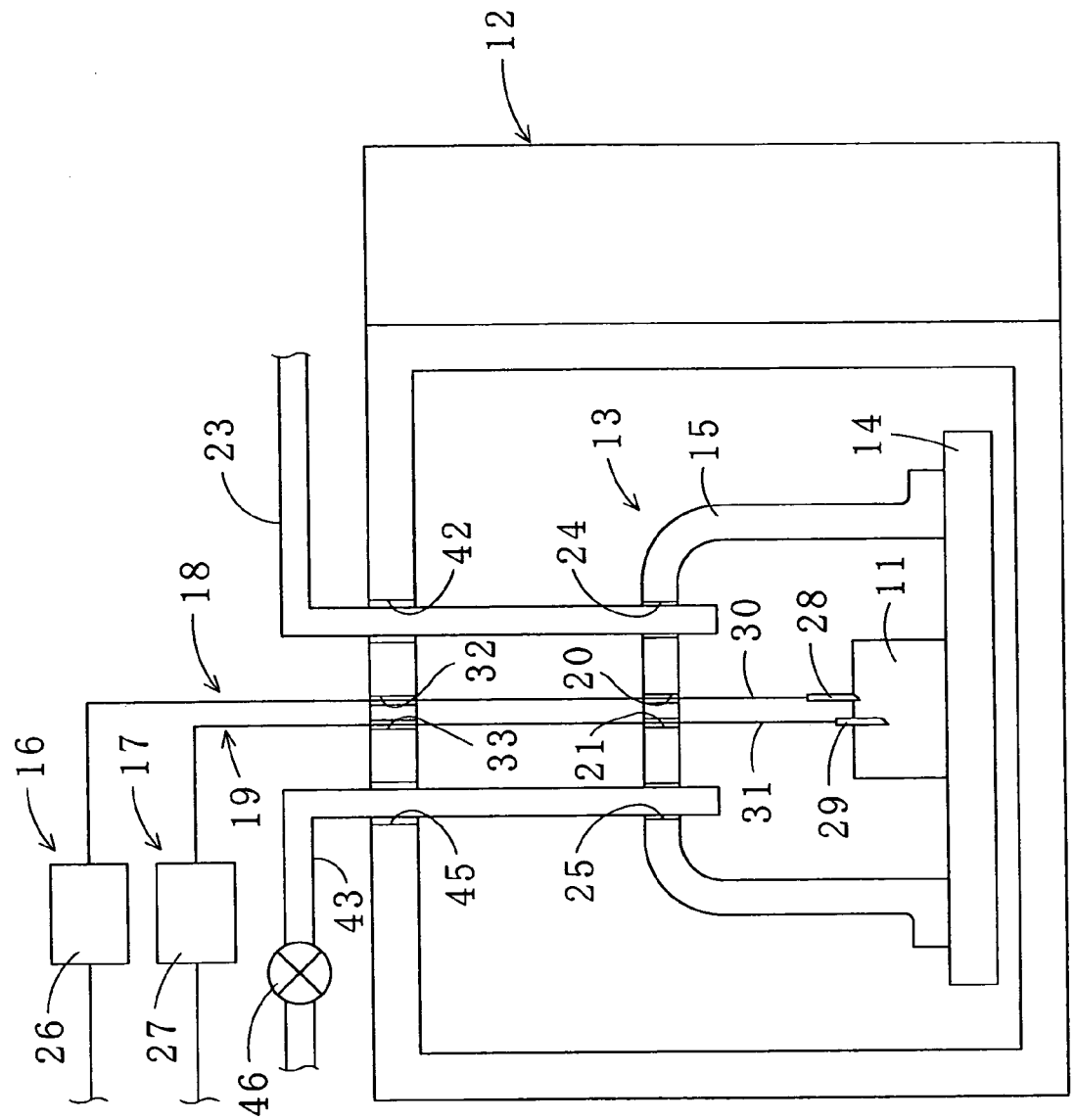
FIG. 2 is an explanatory diagram of a main part of the apparatus.

Referring to FIGS. 1 and 2, an apparatus 10 for drying under reduced pressure using microwaves according to a first embodiment of the present invention will be described.

The apparatus 10 includes a microwave oven 12, an example of a microwave irradiating device for irradiating microwaves to an object (e.g., a scallop adductor muscle) 11. In the microwave oven 12, a chamber 13 is disposed for housing the object 11. The chamber 13 is formed by a plate glass 14 and a bell-shaped glass container 15 mounted on the plate glass 14. The chamber 13 is hermetically sealed when the inside thereof is reduced in pressure.

Besides the scallop adductor muscle, food as the object may be selected from, e.g., raw materials for dried goods comprising one or more of abalones, fishes, shiitake mushrooms, etc.; fruits as raw materials for dried fruits; vegetables used in health foods, instant foods, etc.; and food waste used as livestock feed, such as vegetable and fish scraps discharged from markets or the like. A deterioration temperature for drying the food is a denaturation temperature (or a decomposition temperature) of constituents of the food, e.g., proteins, starches, vitamins, etc.

Furthermore, the object to be dried may be selected from heat-deformable articles such as washed clothes, lumber, glass whereon a liquid crystal film is deposited, rinsed electronic boards whereon electronic components are mounted, and paper used as an insulator in electronic components such as capacitors. The deterioration temperature of clothes is a temperature at which cloth of the clothes is damaged or shrinks. The deterioration temperature of lumber or glass is a temperature at which a crack or a warp occurs on the lumber or the glass. The deterioration temperature of electronic boards is a temperature at which electronic components thereof are damaged or deformed. The deterioration temperature of paper is a temperature at which the paper deforms.

The use of the apparatus 10 also allows dehydration of sludge such as sewage sludge, livestock excreta, etc., and drying of applied coating materials without causing deterioration (destruction of the composition and burning) and deformations.

The microwave oven 12 generates microwaves having a frequency of 2450 MHz (2.45 GHz) by a magnetron not shown, an example of a microwave generating unit provided in the microwave oven 12. The "microwaves" is a generic term to represent electromagnetic waves having a wavelength of about 1 to 30 cm and a frequency in a range of 1000 MHz to 30 GHz. The microwaves are used in radars, telephones, telecasts, etc., and serve an important role in studies of molecular structures of substances. The microwaves penetrate glass, paper, etc., and are reflected by metals but easily absorbed by water.

By the microwave oven 12, the microwaves generated from the magnetron are applied to the object 11, thereby vibrating water molecules in the object 11. Consequently, only the water in the object 11 is heated and evaporated, whereby the object 11 is dried. Microwave drying allows traveling directions of both the water and heat to be directed from the interior to the exterior of the object 11, and thus drying efficiency is improved. The microwave irradiating (radiating) device may be a waveguide, an antenna, or the like.

It is difficult to measure the temperature of the object 11 in the chamber 13 by an electrical thermometer such as a thermocouple or a thermistor. Accordingly, fiber-optic fluorescence thermometers (hereafter simply referred to as thermometers) 16 and 17 capable of measuring temperature under high-frequency or high-voltage conditions are preferably used. Temperatures on the surface and inside the object 11 are measured by the thermometers 16 and 17, respectively. The glass container 15 has through-holes 20, 21, a gas outlet 24, and a gas intake 25 at an upper portion thereof. Sensors 18 and 19 of the thermometers 16 and 17 are inserted in the chamber 13 through the through-holes 20 and 21, respectively. Attached to the gas outlet 24 is an exhaust pipe 23 connected to a depressurizing pump (e.g., vacuum pump) 22 for depressurizing the inside of the chamber 13. The gas intake 25 is provided for introducing air (an example of a gas) into the chamber 13. The gas (carrier gas) supplied through the gas intake 25 may be air, nitrogen, or the like, and the carrier gas allows water evaporated by microwave irradiation to be discharged out of the chamber 13. The removal of water in the chamber 13 in this way reduces humidity inside the chamber 13, thereby promoting dehydration of the object 11.

The thermometers 16 and 17 respectively have thermometer controllers 26 and 27 disposed outside the microwave oven 12. The sensors 18 and 19 for directly measuring the temperatures of the object 11 are connected to the thermometer controllers 26 and 27, respectively. The sensors 18 and 19 respectively include sensor portions 28 and 29, and coated fiber-optic cables (hereafter referred to as cables) 30 and 31. The sensor portions 28 and 29 have fiber optics inside and distal ends thereof are applied with thin film of a fluorescent material (e.g., magnesium-based phosphor) not shown. The cables 30 and 31 connect the thermometer controllers 26, 27 to the sensors 28, 29, respectively. The microwave oven 12 is provided with through-holes 32 and 33 through which the cables 30 and 31 pass, respectively, so that the cables 30 and 31 are connected respectively to the thermometer controllers 26 and 27 disposed outside the microwave oven 12.

The temperatures of the object 11 are measured by flashing a flashlight on the fluorescent material on the sensor portions 28 and 29 respectively from the thermometer controllers 26 and 27 via the fiber optics, and then measuring decay of fluorescent brightness that changes with temperature (i.e., fluorescent decay time). The sensor portions 28 and 29 in a needle-like form are employed so that they can be placed on the surface and inside the object 11, respectively. The thermometer controllers 26 and 27 are connected to a measurement station 34 which stores measured data.

A computer 35 is connected to the measurement station 34. The computer 35 is an example of a control device for analyzing the data stored on the measurement station 34 and turning on and off the microwave irradiation by the microwave oven 12 based on the analysis of the measured values of the thermometers 16 and 17. The computer 35 performs temperature control in the following manner. The computer 35 stops the microwave irradiation by controlling the microwave oven 12 when the analyzed data reaches a specific temperature "A", which is below a denaturation temperature of the object 11. After the suspension of the microwave irradiation, when the analyzed data reaches a specific temperature "B" (e.g., 30° C.), which is in the vicinity of or higher than a saturation temperature corresponding to a pressure in the chamber, the computer 35 resumes the microwave irradiation to the object 11 by controlling the microwave oven 12. Since the object 11 is the scallop adductor muscle in this embodiment, the specific temperature "A" was set to 40° C., which is below the denaturation temperature of the scallop adductor muscle, i.e., about 42° C.

The pipe 23 connects the inside of the chamber 13 to the depressurizing pump 22. A pressure sensor 36, an open/close valve 37, a vacuum tank 38, and a pressure-regulating valve 39 are attached to the pipe 23 between the microwave oven 12 and the depressurizing pump 22 in order from the upstream (from the microwave oven side). The pressure sensor 36 is connected to the measurement station 34 via an amplifier 40, and pressure values measured by the pressure sensor 36 at predetermined time intervals are stored on the measurement station 34. A mercury manometer 41 for measuring the pressure in the vacuum tank 38 is connected to the vacuum tank 38. The microwave oven 12 is formed with a through-hole 42 through which the exhaust pipe 23 passes.

To the gas intake 25 of the glass container 15, a suction pipe 43 is connected for supplying air outside the microwave oven 12 into the chamber 13. A flowmeter 44 disposed outside the microwave oven 12 is connected to the other end of the suction pipe 43. The microwave oven 12 is formed with a through-hole 45 through which the suction pipe 43 passes, and the suction pipe 43 is provided with a flow-regulating valve 46. Because the inside of the chamber 13 is depressurized by the depressurizing pump 22, opening the flow-regulating valve 46 allows the air outside the microwave oven 12 to be supplied into the chamber 13 through the suction pipe 43. The supplied air forms a current around the object 11, thereby promoting dehydration of the object 11. The suction pipe 43, the flowmeter 44, the flow-regulating valve 46 with an inlet open to the outside air and the depressurizing pump 22 form an airflow generating device, and depressurization of the inside of the chamber 13 by the depressurizing pump 22 allows the outside air passing through the flowmeter 44 and the flow-regulating valve 46 to be admitted into the chamber 13. Here, the flow-regulating valve 46 is regulated considering performance of the depressurizing pump 22 so that the pressure in the chamber 13 is maintained at or below the saturated vapor pressure corresponding to the specific temperature "A". (This operation is also conducted in embodiments described below.)

To maintain the air in the chamber 13 under reduced pressure, the air evacuated from the chamber 13 by the depressurizing pump 22 and the air supplied to the chamber 13 through the suction pipe 43 are regulated by the pressure-regulating valve 39 and the flow-regulating valve 46, respectively. The water in the chamber 13 evaporated by the microwave irradiation is discharged from the chamber 13 through the gas outlet 24 and the exhaust pipe 23. Removal of the water in the chamber 13 in this way reduces humidity in the chamber 13 and further promotes dehydration of the object 11.

The through-holes 20, 21, the gas outlet 24, and the gas intake 25 formed on the glass container 15, and the through-holes 32, 33, 42, 45 formed on the microwave oven 12 are sealed up by O-rings, sealing resin, or the like not shown. Because the through-holes 20, 21, the gas outlet 24, and the gas intake 25 are sealed, depressurization of the inside of the chamber 13 brings the plate glass 14 and the glass container 15 in close contact, whereby the inside of the chamber 13 is hermetically sealed. Grease may be applied on contact surfaces of the plate glass 14 and the glass container 15 before bringing them into close contact.

Next, a method for drying the object 11 under reduced pressure using the apparatus 10 will be described.

First, the sensor portion 28 of the thermometer 16 and the sensor portion 29 of the thermometer 17 are respectively placed on the surface and inside the object 11, and the object 11 is placed in the chamber 13. Next, the air in the chamber 13 is evacuated by the depressurizing pump 22. Alternatively, the air in the chamber 13 is evacuated by the depressurizing pump 22 with the flow-regulating valve 46 opened, so that the external air is supplied into the chamber 13 through the gas intake 25. Thereby, the inside of the chamber 13 is maintained at or below the saturated vapor pressure at the specific temperature "A", e.g., maintained at a reduced pressure of 50 to 150 mmHg (6.7 to 20.0 kPa). Because the inside of the chamber 13 is reduced in pressure, evaporation temperature of water decreases. As a result, the object 11 can be dried at low temperatures. In this embodiment, the object 11 is the scallop adductor muscle and the specific temperature "A" is set to 40° C., which is below the denaturation temperature (about 42° C.) of the object 11, i.e., the scallop adductor muscle. Accordingly, the chamber 13 is depressurized by the depressurizing pump to or below 7.376 kPa, which is the saturated vapor pressure at the specific temperature "A".

While the temperatures on the surface and inside the object 11 are measured by the thermometers 16 and 17, respectively, the microwaves are generated and applied to the object 11 by the microwave-generating unit of the microwave oven 12 to heat the object 11. By the microwave irradiation to the object 11, the water molecules in the object 11 are made to vibrate and produce heat. Because of the heat, the water in the object 11 evaporates.

When the microwaves are applied to the object 11 by the microwave oven 12 and the surface or the inside temperature of the object 11, i.e., either of the measured values of the thermometers 16 and 17 reaches 40° C., the microwave irradiation by the microwave oven 12 is stopped by a signal from the computer 35. This prevents the object 11 from being heated to or above its denaturation temperature and the object 11 can be dried without being deteriorated.

The object 11 is cooled and the temperature thereof is reduced by latent heat of the water evaporated by the microwave irradiation. When any measured value of the temperatures of the object 11 detected by the thermometers 16 and 17 reaches a specific temperature "B" (e.g., 30° C.), which is in the vicinity of or higher than the saturation temperature corresponding to the pressure in the chamber, the microwave oven 12 is turned on by a signal from the computer 35. Thereby, microwave irradiation to the object 11 is resumed to heat the object 11.

The object 11 is dried by the temperature control through intermittent irradiation of the microwaves. The intermittent irradiation of the microwaves is to repeat a step of suspending the microwave irradiation when the temperature of the object 11 increases to the specific temperature "A" by the microwave irradiation, and a step of resuming the microwave irradiation when the temperature of the object 11 lowers to the specific temperature "B" by the latent heat of water evaporated by the microwave irradiation. By heating the object 11 in a pulsing manner as described above, the water inside the object 11 is allowed to move to the surface of the object 11 after the water on the surface of the object 11 is evaporated. As a result, the drying efficiency is improved.

While the chamber 13 is maintained under reduced pressure, the air is supplied into the chamber 13 through the gas intake 25 by opening the flow-regulating valve 46, generating the airflow around the object 11. Consequently, dehydration of the object 11 is promoted. Furthermore, the water evaporated from the object 11 and released in the chamber 13 is discharged out of the chamber 13 through the gas outlet 24. At this time, the humidity in the chamber 13 is reduced, which further promotes dehydration of the object 11.

Because of the intermittent irradiation of the microwaves, the temperature of the gas supplied from the chamber 13 to the depressurizing pump 22 is also not increased. Furthermore, the gas is admitted into the chamber by the airflow generating device. Thereby, relative humidity of the exhaust gas is maintained at or below 95% and the life of the depressurizing pump 22 can be extended.

Figure 3:
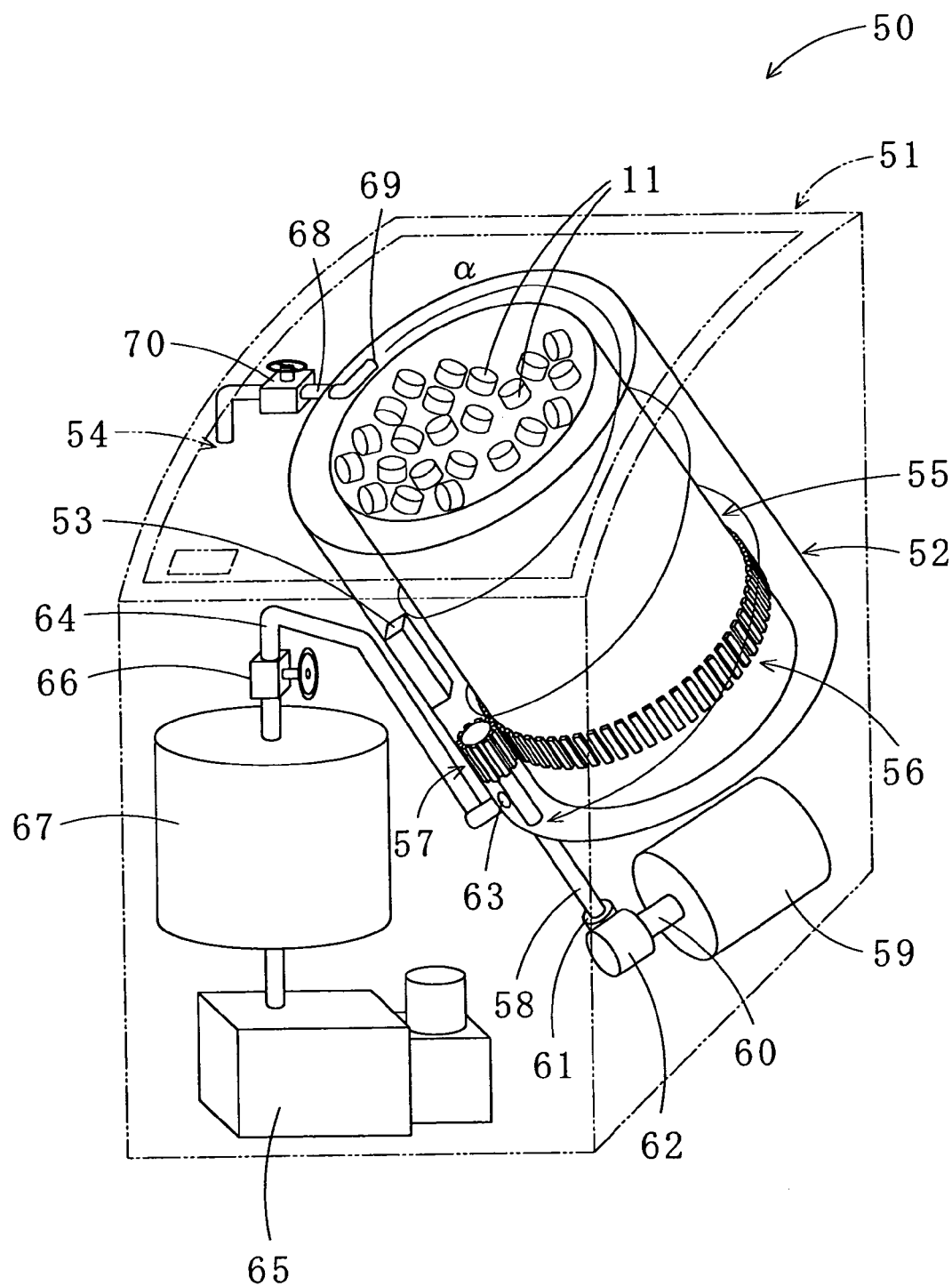
FIG. 3 is an explanatory diagram of an apparatus for drying under reduced pressure using microwaves according to a second embodiment of the present invention.

Referring to FIG. 3, an apparatus 50 for drying under reduced pressure using microwaves according to a second embodiment of the present invention will be described. The same components as those of the apparatus 10 are represented by the same reference numerals and the detailed description thereof is omitted (the same is also true in the following embodiments).

The apparatus 50 includes a hermetically sealable, cylindrical chamber 52 disposed in a casing 51. The chamber 52 is provided with a microwave generating unit 53, an example of a microwave irradiating device for irradiating microwaves toward the interior of the chamber 52.

The apparatus 50 further includes a computer not shown, an example of a control device. The computer controls microwave irradiation time in a manner that the microwaves are irradiated from the microwave generating unit 53 to the objects (scallop adductor muscles) 11 in a predetermined cycle so that the temperature of the objects does not exceed the specific temperature "A" (40° C.), which is below the denaturation temperature (deterioration temperature) of the object 11.

The chamber 52 is disposed in a manner that the central axis thereof is tilted at e.g. 30 degrees to the vertical axis so that the objects 11 in the chamber 52 are stirred appropriately. The casing 51 is open at the top thereof, and a door 54 through which the objects 11 are supplied to the chamber 52 is provided at the top of the casing 51. The chamber 52 is provided with a lid (not shown) for sealing the chamber 52. Alternatively, a lid portion which hermetically seals the chamber 52 when the door 54 is closed may be formed inside the door 54.

In the chamber 52, a cylindrical drying container 55 for housing one or more of the objects 11 is provided. The drying container 55 is open at the top thereof and is disposed in a manner that the central axis thereof is aligned with that of the chamber 52. A lateral side of the drying container 55 is formed with meshes having openings in a size that does not allow the object 11 to pass through. The drying container 55 has a large-diameter gear 56 on an outer circumferential surface of a lower portion thereof. The gear 56 is provided with a small-diameter drive gear 57 engaging therewith. The drive gear 57 is connected to a motor 59 via a rotating shaft 58.

The rotating shaft 58 and a motor rotating shaft 60 of the motor 59 are arranged orthogonal to each other. Spiral gears 61 and 62 are mounted on a proximal end of the rotating shaft 58 and a distal end of the motor rotating shaft 60, respectively. Because of such structure, rotational drive of the motor 59 causes low-speed rotation of the drying container 55.

The chamber 52 has a gas outlet 63 at a lower portion thereof. The gas outlet 63 is connected to a depressurizing pump (e.g., a vacuum pump) 65 for depressurizing the inside of the chamber 52 via an exhaust pipe 64. A pressure-regulating valve 66 and a condenser 67 are connected to the exhaust pipe 64 from the upstream side (from a side of the chamber 52). The condenser 67 is provided for condensing moisture generated in the chamber 52 and storing the condensed moisture, thereby preventing the water from entering the depressurizing pump 65.

The chamber 52 is provided with a gas intake 69 at an upper portion thereof. A suction pipe 68 for introducing the air (an example of the gas) from the outside of the casing 51 to the inside of the chamber 52 is connected to the gas intake 69. A flow-regulating valve 70 for regulating the airflow admitted into the chamber 52 is provided in the middle of the suction pipe 68.

A downstream end portion of the suction pipe 68 is fixed to the cylindrical chamber 52 in a direction tangential to an outer circumference thereof. The air from the gas intake 69 flows into the chamber 52 in a direction substantially tangential to a sidewall of the chamber 52 and forms a swirling flow "a" (i.e., airflow) around the exterior of the drying container 55 housing the objects 11. The suction pipe 68 and the flow-regulating valve 70 are included in an airflow generating device. The swirling flow "a" generated by the airflow generating device enters the drying container 55 through the meshes thereof and comes into contact with the objects 11, thereby accelerating dehydration of the objects 11. The water evaporated from the objects 11 in the chamber 52 is exhausted out of the chamber 52 from the gas outlet 63 together with the swirling flow "a". At this time, humidity in the chamber 52 is reduced, which further promotes dehydration of the objects 11.

Hereafter, a method for drying the objects 11 under reduced pressure employing the apparatus 50 according to the second embodiment of the present invention will be described in details. Description on the same operation and effect as those of the aforementioned embodiment is omitted.

First, a plurality of the objects 11 are placed in the drying container 55. Then, the lid of the chamber 52 is closed to hermetically seal the chamber 52 and the door 54 is closed. While the air inside the chamber 52 is evacuated by the depressurizing pump 65, the flow-regulating valve 70 is opened to supply the outside air into the chamber 52 through the gas intake 69, and the inside of the chamber is depressurized, e.g. to 50 to 150 mmHg (6.7 to 20.0 kPa, more specifically to 7.376 kPa). The amount of the air evacuated by the depressurizing pump 65 is regulated by the pressure-regulating valve 66, and the amount of the air introduced into the chamber 52 is regulated by the flow-regulating valve 70.

In order to heat the objects 11, so-called time-controlled drying is conduced wherein the microwave generating unit 53 is controlled by the computer so that the microwaves are irradiated intermittently from the microwave generating unit 53 in a cycle, thereby rapidly heating the objects 11 in the pulsing manner. The specific temperature "A" for drying the objects 11 is set below about 42° C., which is a denaturation temperature of protein, e.g., to 40° C. The cycle of intermittent irradiation of the microwaves includes microwave irradiation time "a" (ON) and microwave non-irradiation time "b" (OFF). The irradiation time "a" and the suspension time "b" for maintaining the temperatures of the objects 11 at or below the specific temperature "A" are determined beforehand through experiments. Accordingly, the objects 11 are heated at temperatures lower than the denaturation temperature thereof, and thus the objects 11 can be dried without being denatured.

During suspension of the microwave irradiation to the objects 11, the objects 11 are cooled and the temperatures thereof are lowered by latent heat of the water in the objects 11. The latent heat is generated through evaporation of the water by heating the objects 11 to the specific temperature "A" with the microwave irradiation. After the suspension time "b" has passed, the microwaves are irradiated to the objects 11 again to heat the objects 11 to the specific temperature "A" for drying the objects 11. The irradiation time "a" is, e.g., 0.5 sec. to several minutes, preferably one to several sec. although the time varies depending on the object. The suspension time "b" may be equal to or different from the irradiation time "a". Rapid heating of the objects 11 in the pulsing manner causes the water in the objects 11 to move toward the surfaces of the objects 11 after the moisture on the surfaces of the objects 11 is evaporated. As a result, drying efficiency is improved.

The water is exhausted from the gas outlet 63 along with the swirling flow "a" having passed through the chamber 52, and then the water is condensed by the condenser 67. Therefore, the water does not enter the depressurizing pump 65, whereby the life of the depressurizing pump 65 can be extended. Moreover, because the objects 11 are rotated by the motor 59, drying efficiency is improved. It is preferable to rotate the drying container 55 in a direction opposite to a swirling direction of the swirling flow "a" so that the objects 11 can be easily brought into contact with the air.

Figure 4:
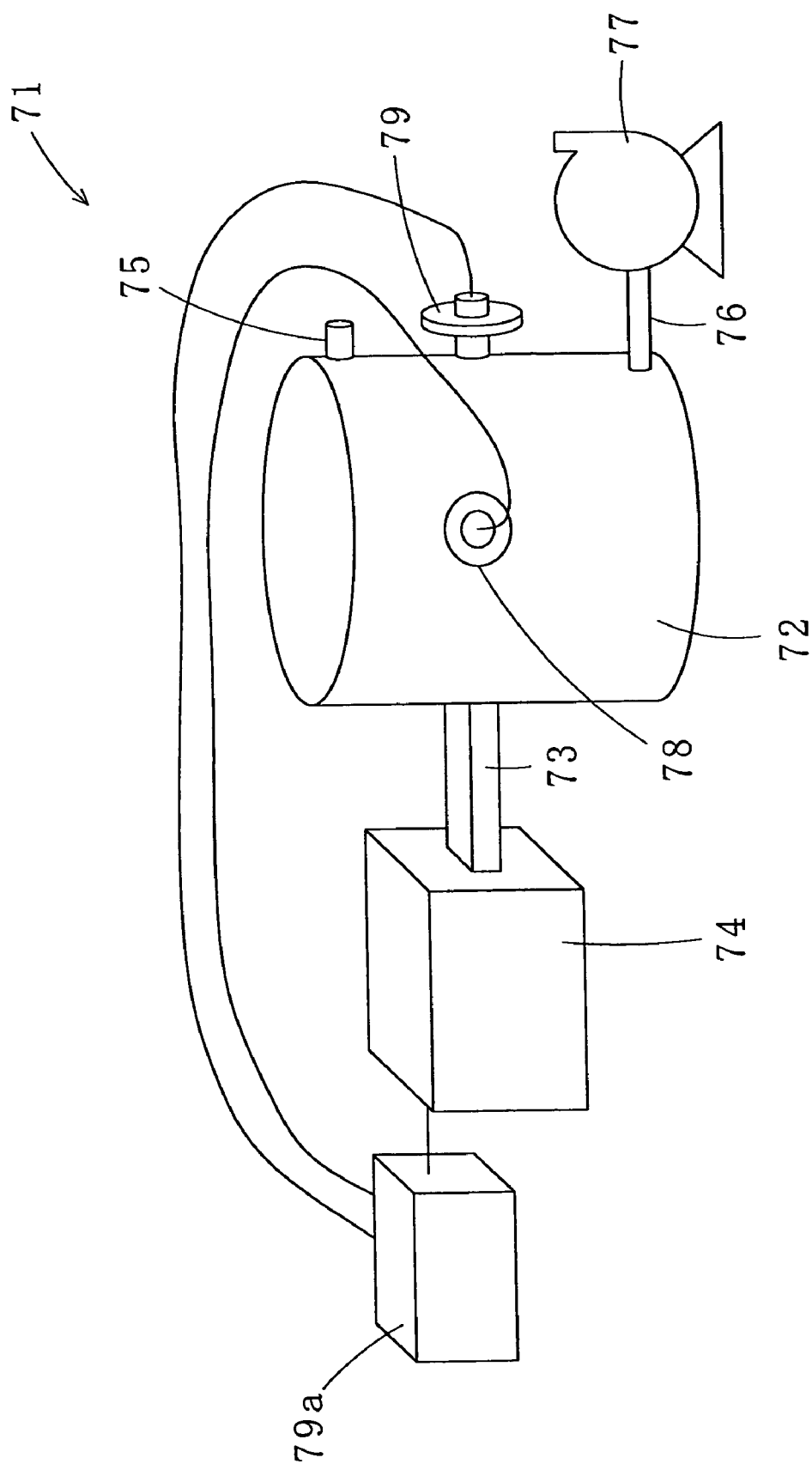
FIG. 4 is an explanatory diagram of an apparatus for drying under reduced pressure using microwaves according to a modification of the second embodiment of the present invention.
Figure 5:
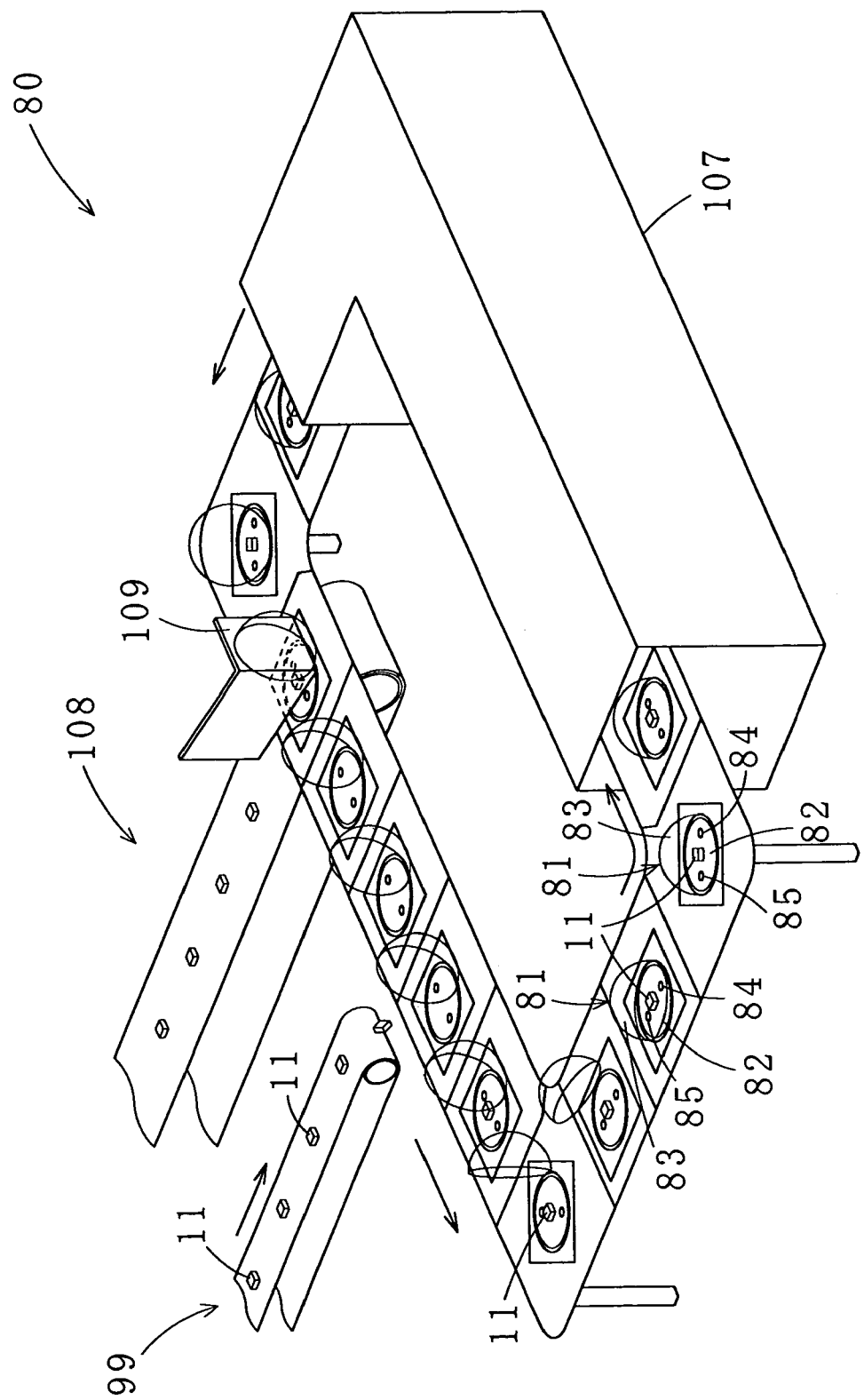
FIG. 5 is an explanatory diagram of an apparatus for drying under reduced pressure using microwaves according to a third embodiment of the present invention.

Referring now to FIG. 4, an apparatus 71 for drying under reduced pressure using microwaves according to a modification of the second embodiment of the present invention will be described.

The apparatus 71 includes a hermetically sealed cylindrical chamber 72. A microwave generating mechanism 74 having a microwave generating unit not shown is attached to the chamber 72 via a waveguide 73. The microwave generating mechanism 74 and the waveguide 73 form a microwave irradiating device. The chamber 72 has a sealing lid not shown at an upper portion thereof through which objects to be dried are supplied into the chamber 72 and dried objects are discharged from the chamber 72. It is optional to provide the chamber 72 with a tray or the like for carrying the objects.

The chamber 72 forms a part of an airflow generating device. The chamber 72 is provided with a gas intake 75 (preferably having a flow regulating valve) for introducing the gas from the outside to the inside of the chamber 72, and a depressurizing pump 77 for reducing the pressure in the chamber 72 to a range of e.g. 50 to 150 mmHg through a vent tube 76. The chamber 72 is provided with a manometer 78 and a thermometer 79 for respectively measuring pressure and temperature in the chamber 72. The apparatus 71 includes a control device 79a. The control device 79a performs on/off control of the microwave generating unit and the depressurizing pump 77 while maintaining the temperature in the chamber 72, namely the temperature of the objects in the chamber 72, below the denaturation temperature of the object by analyzing data from the manometer 78 and the thermometer 79. Because of such structure, the objects are heated below the denaturation temperature thereof, and accordingly the objects can be dried without being denatured.

Referring now to FIGS. 5 to 8, an apparatus 80 for drying under reduced pressure using microwaves according to a third embodiment of the present invention will be described.

Figure 6:
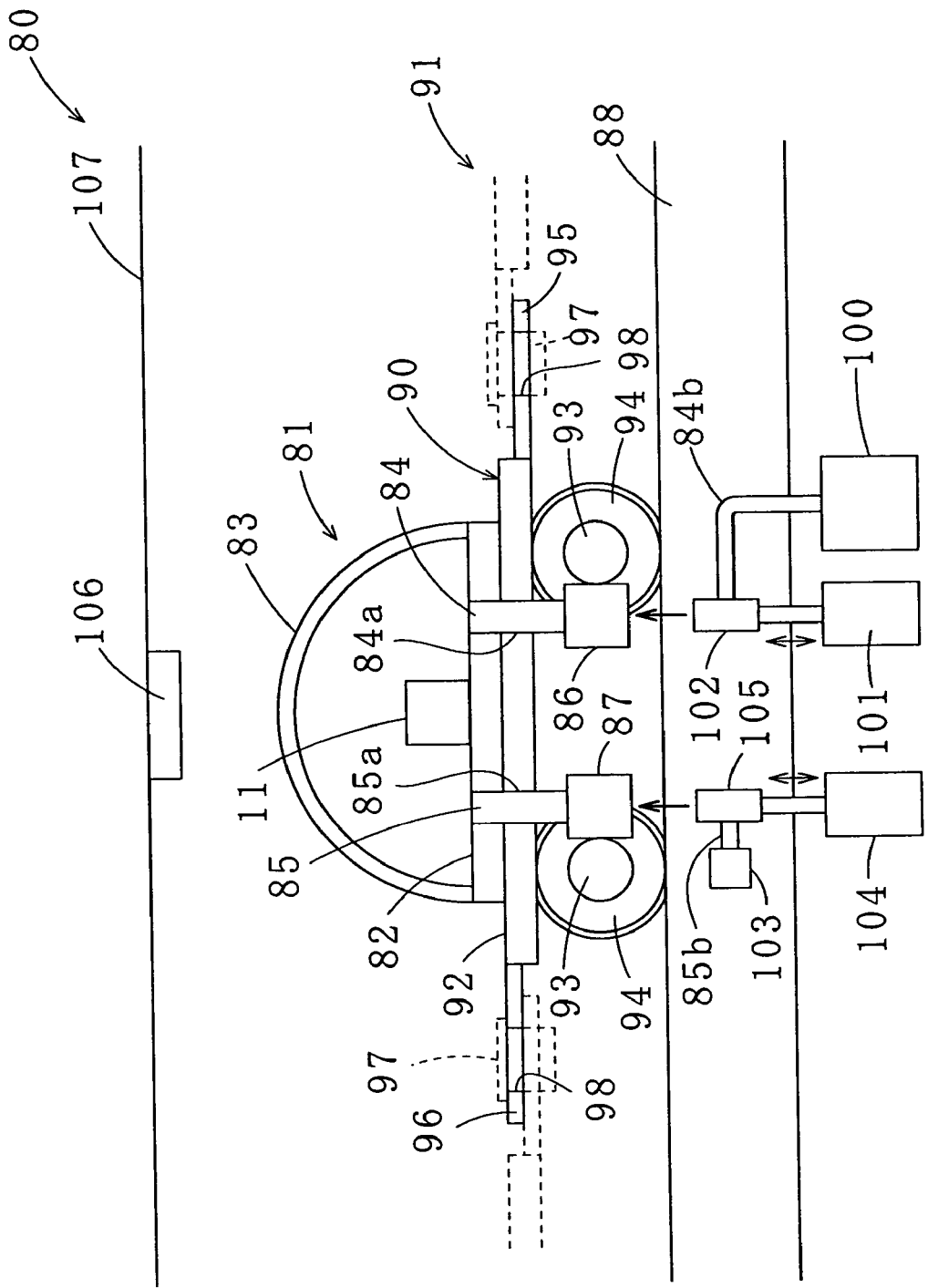
FIG. 6 is a cross-sectional view showing equipment arrangement around lidded trays at a depressurization start station, a microwave heating station and a pressure recovery station.
Figure 7:
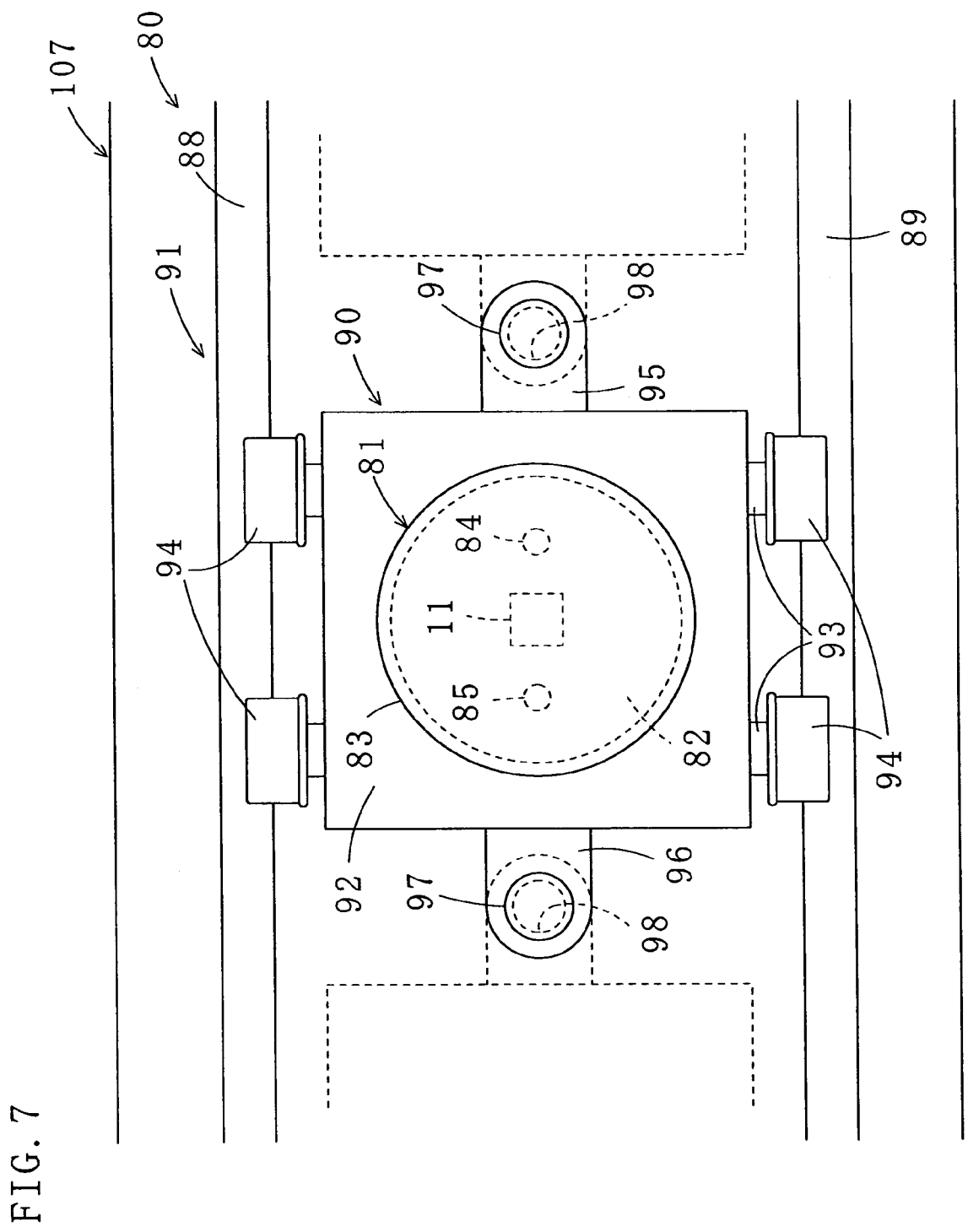
FIG. 7 is a partial plan sectional view of the lidded tray.

The apparatus 80 includes a plurality of (e.g., 18) lidded trays 81, examples of chambers for housing the objects 11. As illustrated in FIGS. 6 and 7, each of the trays 81 is made of a material that reflects microwaves, for example, a metal (specifically, stainless steel). The tray 81 has a tray body 82 for carrying the object 11 and a hemispheric lid 83 for covering the top of the tray body 82. The lid 83 is made of a microwave permeable material, e.g., quartz glass.

The tray 81 is designed such that the lid 83 is openable and closable by an opening and closing mechanism not shown. The tray body 82 is formed on a bottom thereof with an exhaust pipe connecting port 84 and a gas induction pipe connecting port 85. The connecting ports 84 and 85 are provided with female couplers (pipe coupling devices) 86 and 87, respectively. Each of the couplers 86 and 87 has an open/close valve that is usually closed.

As illustrated in FIGS. 5 to 8, the apparatus 80 includes a pair of endless rails (hereafter simply referred to as rails) 88 and 89 disposed with a constant distance therebetween, and a conveyor 91 having eighteen carriages 90. The linked carriages 90 are disposed over the rails 88, 89 and are arranged throughout the lengths of the rails 88 and 89. The trays 81 are respectively fixed on the carriages 90, and the trays 81 are conveyed intermittently by a certain distance (the number of the carriages/a length of a rail path) by the conveyor 91. Namely, the conveyor 91 has eighteen stop positions and the trays 81 are stopped sequentially at the respective stop positions.

Each of the carriages 90 comprises four wheels 94 and a plate-shaped carriage body 92 for carrying the tray 81. The wheels 94 are disposed at both ends of two shafts 93 mounted at front and rear of the carriage body 92, and run on the rails 88 and 89. The carriage body 92 has links 95 and 96 at the front and rear thereof for connecting adjacent carriages 90. Each of the links 95 and 96 is formed with a shaft hole 98 in which a connecting pin 97 is fitted so that the carriages 90 can travel smoothly on the rails 88 and 89. The conveyor 91 is provided with a drive unit not shown for intermittently conveying the carriages 90. The drive unit may be mounted on each of the carriages 90 or the drive unit may be a conveying unit that conveys the carriages 90 by a predetermined distance through actuation of a cylinder.

Figure 8:
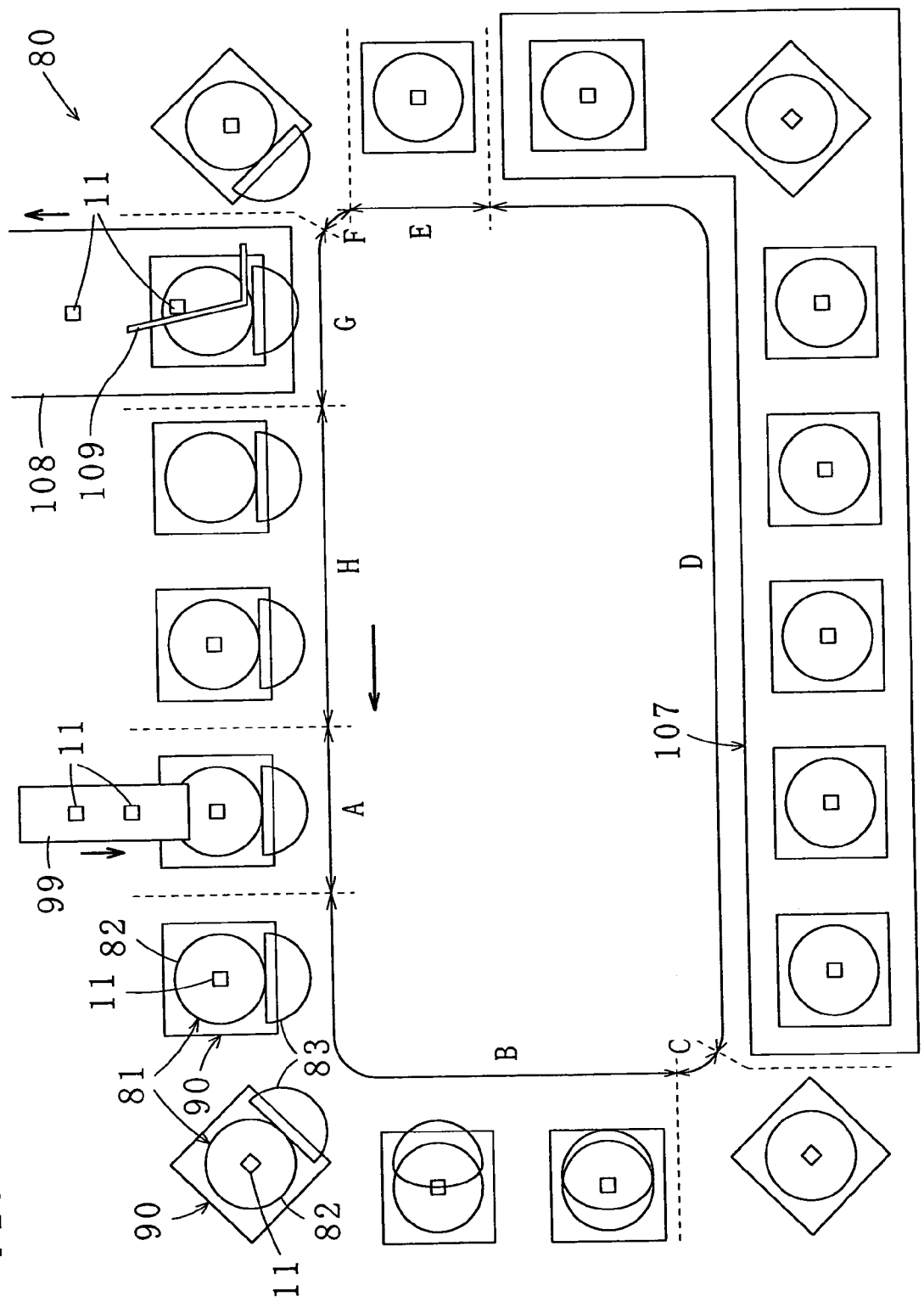
FIG. 8 is an arrangement diagram of the lidded trays of the apparatus according to the third embodiment of the present invention.

As shown in FIG. 8, the conveyor 91 has a feed station "A" where the object 11 is supplied from a feed conveyor 99 onto the tray 81. At the feed station "A", the object 11 conveyed by the feed conveyor 99 is placed on the tray body 82 with the lid 83 opened.

A sealing station "B" is provided downstream of the feed station "A" in a traveling direction. The sealing station "B" has four stop positions where the lid is covered on the tray body 82. Although four stop positions are employed in this embodiment, one or two stop positions may be used to conduct entire lid closing operation.

A depressurization start station "C" is provided downstream of the sealing station "B" in the traveling direction. At the station "C", male couplers 102 and 105 are provided beneath the conveyor 91 as illustrated in FIG. 6 (a microwave generating unit 106 is not provided at the station "C"). The male coupler 102 is connected to the depressurizing pump 100 and is moved up and down by an elevating mechanism 101. The male coupler 105 is connected to a flow-regulating valve 103 provided for introducing the outside air, and is moved up and down by an elevating mechanism 104. When the male couplers 102 and 105 are elevated by the elevating mechanisms 101 and 104, respectively, the couplers 102 and 105 are united with the female couplers 86 and 87, respectively. When the male couplers 102 and 105 are lowered by the elevating mechanisms 101 and 104, respectively, the couplers 102 and 105 are detached from the female couplers 86 and 87, respectively. At this time, passages in the female couplers 86 and 87 are closed. Because of such structure, the tray 81 is depressurized when the tray 81 is temporarily stopped at the station "C". At this time, if necessary, an airflow may be generated in the tray 81 by opening the flow-regulating valve 103.

The flow-regulating valve 103, the female coupler 87, the male coupler 105, the gas induction pipe connecting port 85 and the depressurizing pump 100 form an airflow generating device. In FIG. 6, reference numerals 84a and 84b denote exhaust pipes, and reference numerals 85a and 85b denote blast pipes. The couplers with shutoff valves (the female and male couplers 86, 102) are provided between the exhaust pipes 84a and 84b, and the couplers with shutoff valves (the female and male couplers 87, 105) are provided between the blast pipes 85a and 85b. Since the respective pairs of the couplers are connected to or detached from each other by the elevating mechanisms 101 and 104, respectively, it is preferable to use couplers without retaining rings.

A microwave heating station "D" having seven stop positions is provided downstream of the depressurization start station "C." in the traveling direction. At the station "C", the tray 81 is depressurized to a certain extent and then the male couplers 102 and 105 are lowered to detach the couplers 102 and 105 from the female couplers 86 and 87. Subsequently the tray 81 is conveyed to the station "D". As shown in FIG. 6, the male coupler 102 and the female coupler 105 are provided beneath each of the seven stop positions. The male coupler 102 is connected to the depressurizing pump 100 and is moved up and down by the elevating mechanism 101. The male coupler 105 is connected to the flow-regulating valve 103 for introducing outside air and is moved up and down by the elevating mechanism 104. At the station "D", the airflow generating device is operated to generate the airflow around the object 11 while the inside of the tray 81 is depressurized. Moreover, at the station "D", when the tray 81 mounted on the carriage 90 moves from one stop position to another, the elevating mechanisms 101 and 104 are operated to connect the male couplers 102, 103 to the female couplers 86, 87, respectively, or to detach the male couplers 102, 103 from the female couplers 86, 87, respectively.

At each stop position in the station "D", the microwave generating unit 106, an example of a microwave generating device, is provided above the tray 81. Furthermore, at the station "D", a casing 107 is provided for preventing a leakage of the microwaves generated from the microwave generating unit 106 to the outside.

At the station "D", the microwaves are irradiated intermittently in a predetermined cycle so that the temperature of the object 11 in the tray 81 is maintained below the deterioration temperature of the object 11. In actual operation, experiments are conducted for the objects 11 to determine the intermittent irradiation cycle and power of the microwaves which maintain the temperature of the object 11 within a prescribed range (e.g., between the specific temperatures A and B). The experiments are performed under the same conditions (the same or improved apparatus of the first embodiment may be used), and temperatures of the objects 11 irradiated with the microwaves are measured.

The tray 81 housing the object 11 that was subjected to a predetermined drying treatment at the station "D" is conveyed to a pressure recovery station "E". The male coupler 105 provided with the flow-regulating valve 103 and the elevating mechanism 104 for elevating and lowering the coupler 105 are provided below the station "E" as illustrated in FIG. 6. The microwave generating unit 106, the depressurizing pump 100, the elevating mechanism 101 and the male coupler 102 are not provided at the station "E". Air is introduced from the outside to the inside of the tray 81 via the flow-regulating valve 103.

The tray 81 is subsequently conveyed to an opening station "F", where the lid 83 is opened. The tray 81 is then conveyed intermittently to a discharge station "G", where the dried object 11 on the tray body 82 is discharged from the tray body 82 via a discharge conveyor 108. At the station "G", a guide 109 may be provided for guiding the object 11 to the outside in accordance with the movement of the carriages 90.

The tray 81 is emptied by the above operation and is conveyed to a feed preparation station "H", where the tray body 82 is cleaned, and then the tray 81 is conveyed to the station "A". The intermittent conveying operation of the carriages 90 as described above are repeated to continuously dry a multiplicity of the objects 11.

Figure 9:
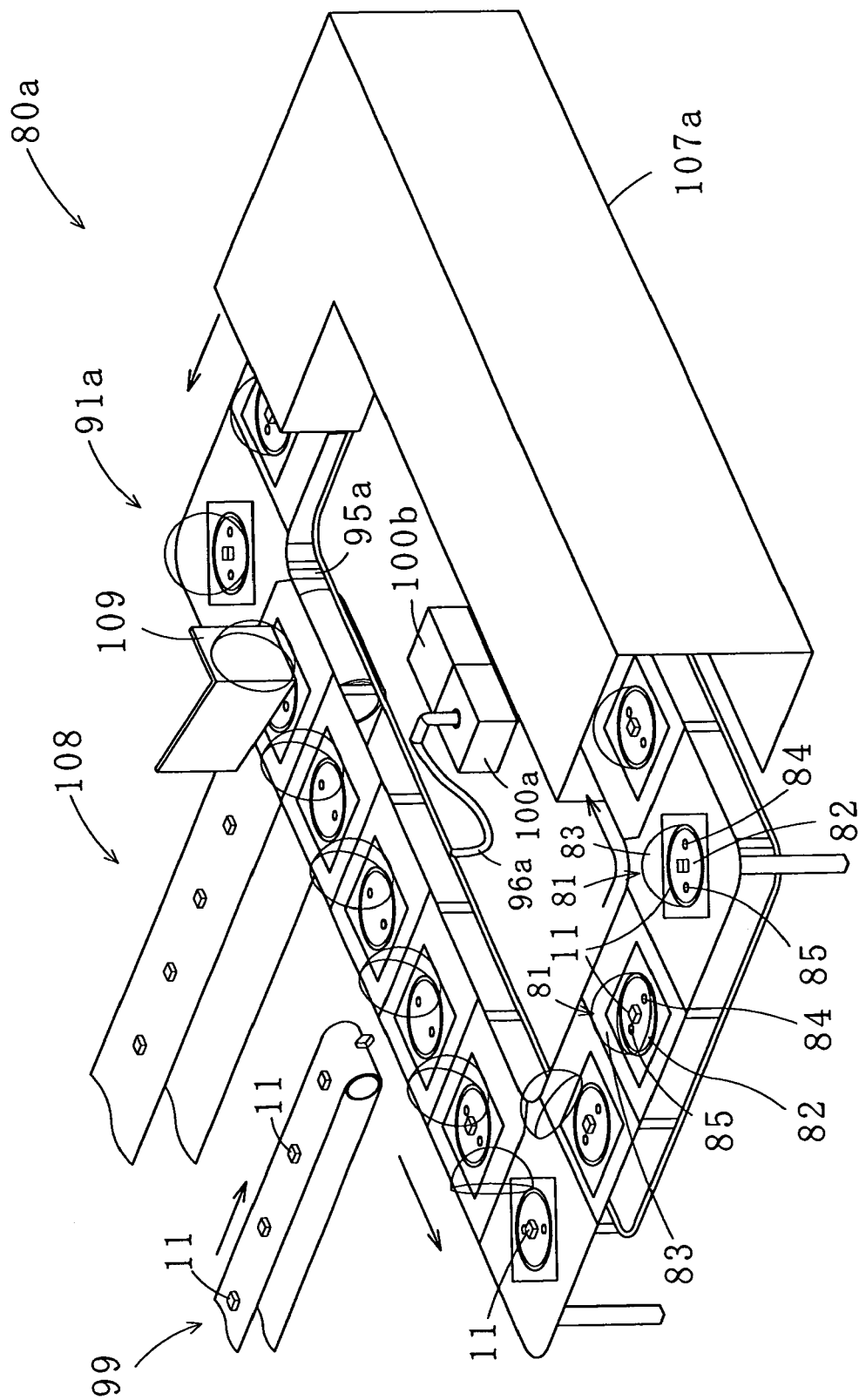
FIG. 9 is an explanatory diagram of an apparatus for drying under reduced pressure using microwaves according to a modification of the third embodiment of the present invention.
Figure 10:
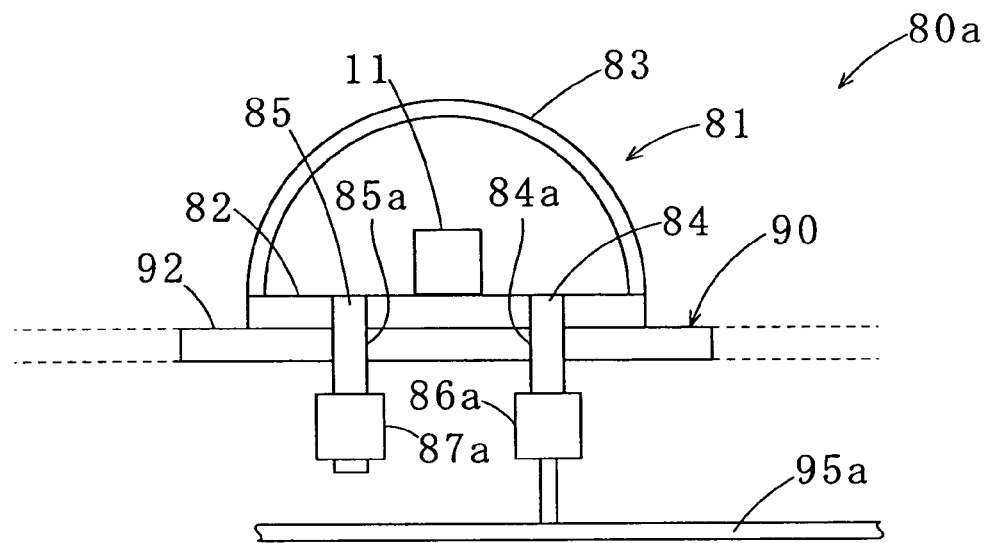
FIGS. 10 (A) and 10 (B) are a front sectional view and a side sectional view, respectively, of equipment arrangement around the lidded trays at a depressurization start station, a microwave heating station and a pressure recovery station.
Figure 10:
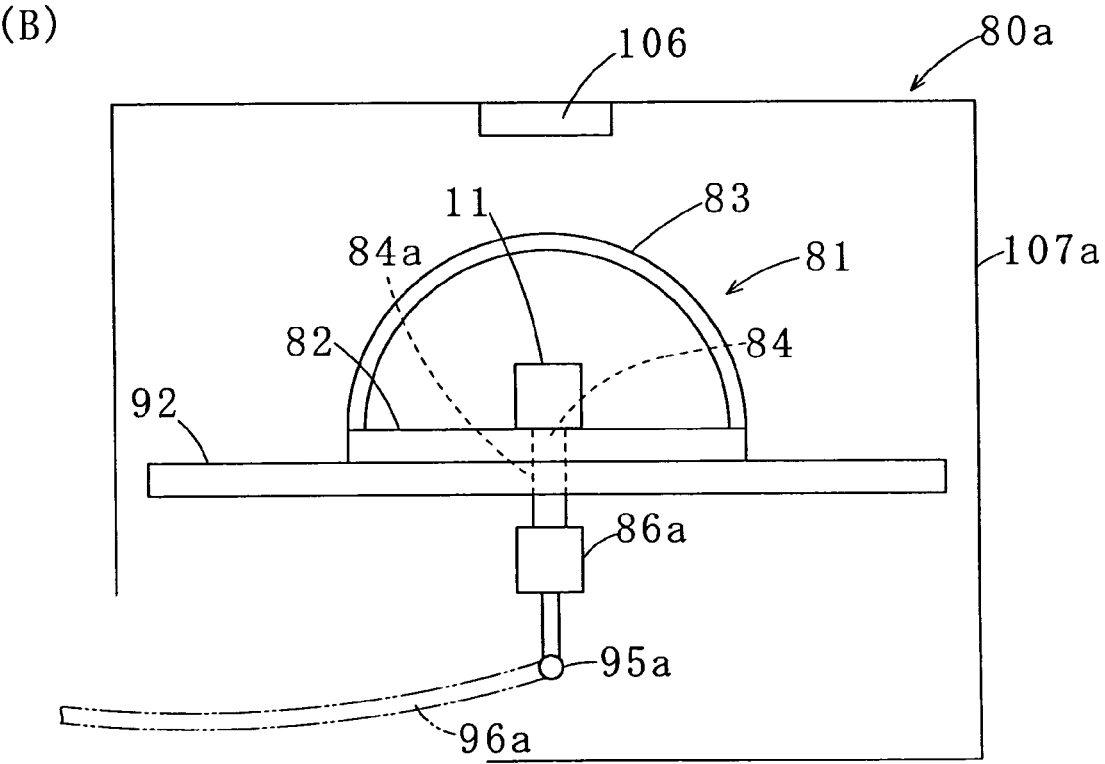

Referring now to FIGS. 9, 10 (A), and 10 (B), an apparatus 80a for drying under reduced pressure using microwaves according to a modification of the third embodiment of the present invention will be described.

The apparatus 80a includes the lidded trays 81 each having the tray body 82 and the lid 83. The tray body 82 is provided with the exhaust pipe connecting port 84 and the gas induction pipe connecting port 85 at the bottom portion thereof. The eighteen trays 81 are mounted on a chain conveyor 91a (an example of a conveyor). As illustrated in FIG. 8, the apparatus 80a has the feed station "A", sealing station "B", depressurization start station "C", microwave heating station "D", pressure recovery station "E", opening station "F", discharge station "G", and feed preparation station "H".

The blast pipe 85a having a flow-regulating valve 87a at a distal portion thereof is connected to the gas induction pipe connecting port 85. The exhaust pipe 84a having an open/close valve (an electromagnetic valve) 86a is connected to the exhaust pipe connecting port 84. An endless flexible tube 95a is connected to a distal portion of the exhaust pipe 84a provided to the tray body 82 of each of the eighteen trays 81. The flexible tube 95a is connected to a depressurizing pump 100a via a pump tube 96a and a rotary joint not shown. The rotary joint prevents the tube 96a from being tangled when the trays 81 are rotationally conveyed.

A signal line (not shown) for opening and closing the valve 86a provided to each of the tray bodies 82 is disposed along the tube 96a. The signal line is connected via the rotary joint to a control device 100b provided adjacent to the depressurizing pump 100a. Signals from the control device 100b open the valves 86a connected to the trays 81 located at the depressurization start station C and the microwave heating station D, depressurize the inside of the trays 81, and furthermore, supply the outside air into the trays 81 through the ports 85.

A casing 107a of the discharge station D differs from the casing 107 of the apparatus 80 in the following point. The casing 107a is open at inner lower sides thereof so as to allow smooth movements of the pump tube 96a connected to the trays 81 conveyed by the chain conveyor 91 and the signal line provided along the tube 96a.

The control device 100b generates signals for, besides opening/closing control of the valves 86a, drive of the chain conveyor 91a, opening/closing of the lids 83 of the trays 81, and on/off control of the microwave generating unit 106 according to a program. Operations at the respective stations A through H of the apparatus 80a are basically the same as those of the apparatus 80, and thus detailed explanation on the operations are omitted.

Figure 11:
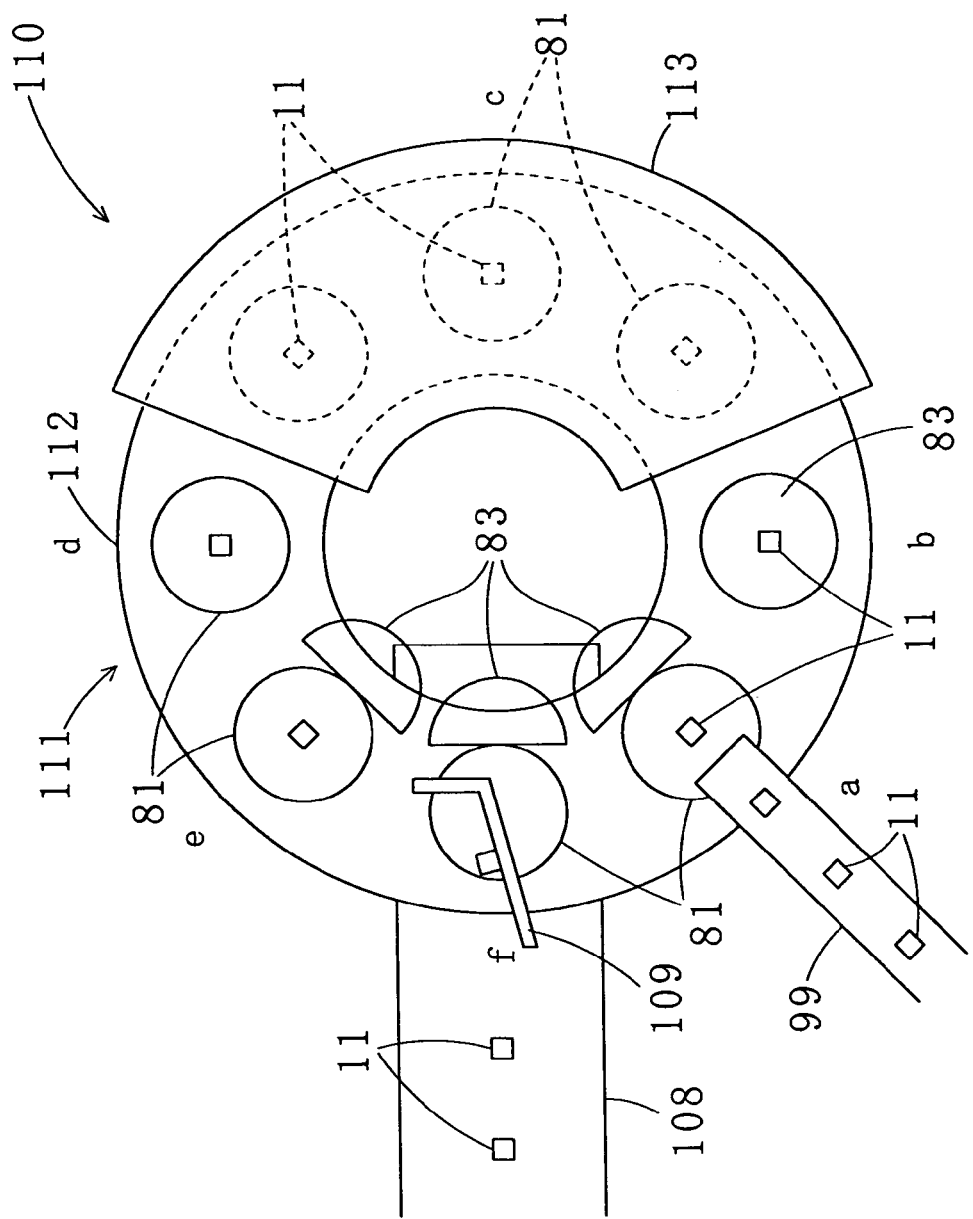
FIG. 11 is an explanatory diagram of an apparatus for drying under reduced pressure using microwaves according to another modification of the third embodiment of the present invention.

Referring now to FIG. 11, an apparatus 110 for drying under reduced pressure using microwaves according to another modification of the third embodiment of the present invention will be described.

In the apparatus 110, a carriage 112 of a conveyor 111 is a doughnut-shaped plate. On the carriage 112, there are mounted a plurality of, e.g. eight, trays 81 at predetermined intervals. The apparatus 110 are divided sequentially into a feed station "a", a sealing and depressurizing station "b", a microwave heating station "c", a pressure recovery station "d", an opening station "e", and a discharge station "f" where the object 11 is discharged.

At the feed station "a", the object 11 is fed onto the tray 81 from the feed conveyor 99. At the sealing and depressurizing station "b", the lid 83 of the tray 81 is closed, and then air in the hermetically sealed tray 81 is evacuated by the depressurizing pump 100 (see FIG. 6). At the microwave heating station "c", the tray 81 that has been depressurized is conveyed into a casing 113 having a microwave generating unit (not shown) inside. While the inside of the tray 81 is depressurized and the airflow is generated, the microwaves are irradiated to the object 11 from the microwave generating unit not shown to dry the object 11. At the pressure recovery station "d", the pressure in the tray 81 came out of the casing 113 is returned to atmospheric pressure. At the opening station "e", the lid 83 of the tray 81 is opened, and then at the discharge station "f", the dried object 11 in the tray 81 is discharged onto the conveyor 108. At this time, three of the trays 81 are located at the microwave heating station and one of the tray 81 is located at each of the other stations.

Figure 12:
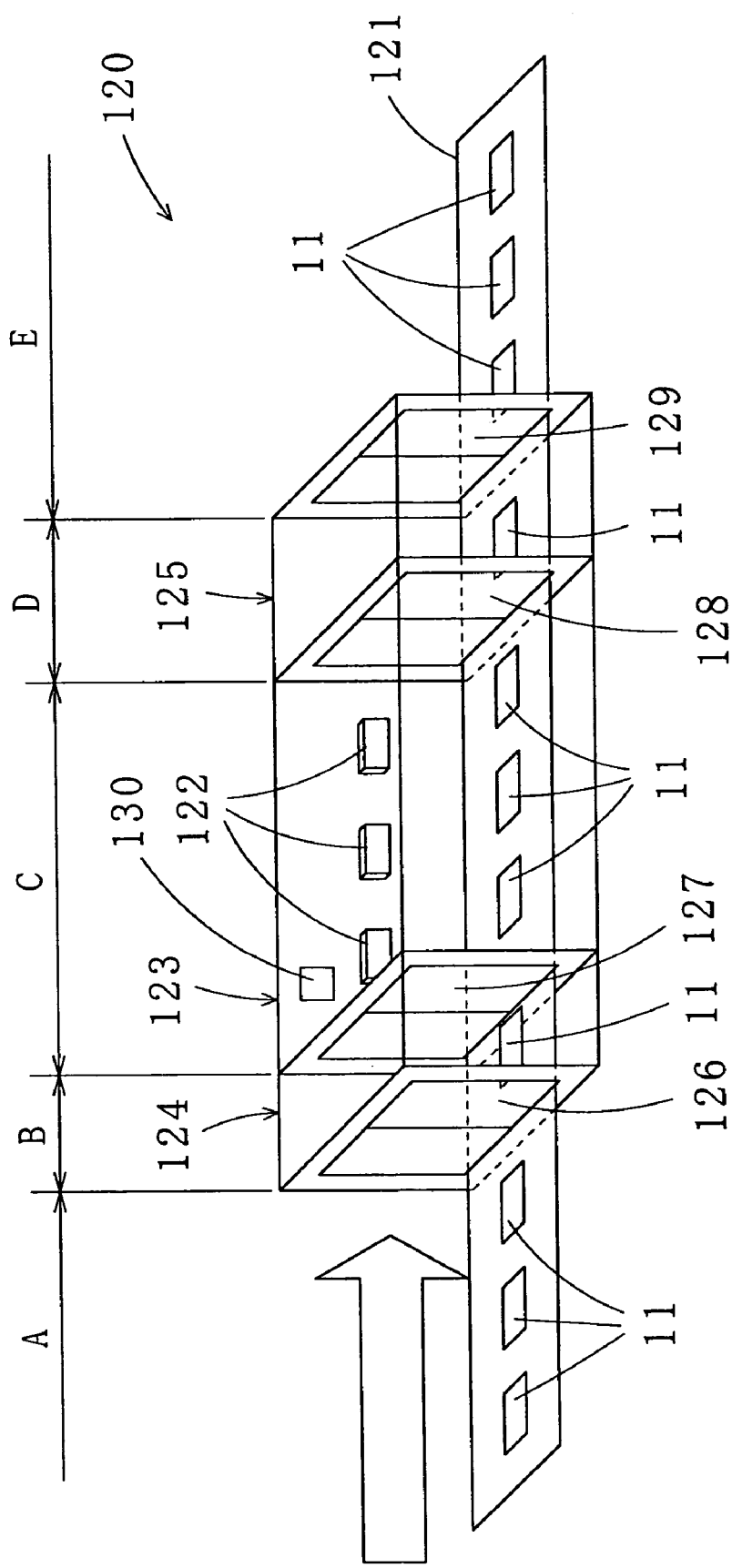
FIG. 12 is an explanatory diagram of an apparatus for drying under reduced pressure using microwaves according to a fourth embodiment of the present invention.

Referring now to FIG. 12, an apparatus 120 for drying under reduced pressure using microwaves according to a fourth embodiment of the present invention will be described.

The apparatus 120 has a roller conveyor (hereafter simply referred to as a conveyor) 121 for conveying the objects 11, a microwave drying chamber (an example of a chamber) 123, a preliminary decompression chamber 124 positioned upstream of the drying chamber 123, and a pressure recovery chamber 125 positioned downstream of the drying chamber 123. The drying chamber 123 is provided with microwave generating units 122 for irradiating the microwaves to the objects 11 conveyed via the conveyor 121 in a reduced-pressure state.

The decompression chamber 124, the drying chamber 123, and the pressure recovery chamber 125 connected in succession from the upstream of the conveyor 121 have doors 126 to 129. The doors 126 to 129 are provided at an inlet on the upstream side of the decompression chamber 124, between the decompression chamber 124 and the drying chamber 123, between the drying chamber 123 and the pressure recovery chamber 125, and at an inlet on the downstream side of the pressure recovery chamber 125, respectively. The doors 126 to 129 allow passage of the objects 11 and hermetically seal the chambers 124, 123, and 125.

Sections of the conveyor 121 at the chambers 124, 123 and 125 are respectively designed to have lengths in the traveling direction for placing, e.g., one object 11, three objects 11, and one object 11, on the conveyor 121 at predetermined intervals. A depressurizing pump not shown is connected to each of the chambers 124, 123 and 125. The drying chamber 123 has a plurality of (e.g., three) microwave generating units 122 at predetermined intervals, a gas intake not shown for introducing a gas (e.g., air) from the outside to the inside of the drying chamber 123, and a fan 130 for generating airflow around the objects 11 by stirring the gas in the chamber 123.

The apparatus 120 performs the intermittent irradiation of the microwaves by a computer not shown, an example of a control device. Namely, the microwaves are irradiated to the objects 11 from the microwave generating units 122 in a predetermined cycle so that the temperatures of the objects 11 are maintained lower than the deterioration temperature of the object 11. Besides the intermittent irradiation of the microwaves, the computer also controls conveying speed of the conveyor 121, opening and closing of the doors 126 to 129, operation of the fan 130 and operation of the depressurizing pumps. The conveyor 121 is divided sequentially from the upstream side into the feed station "A" on an upstream side of the door 126, a depressurizing station "B" in the chamber 124, a heating station "C" in the chamber 123, a pressure recovery station "D" in the chamber 125, and a discharge station "E" on a downstream side of the door 129. The sections of the conveyor 121 at the respective stations are operable separately.

Next, a method for drying the object 11 under reduced pressure using the apparatus 120 will be described. First, at least the doors 127 and 128 are closed and the microwave drying chamber 123 is depressurized by the depressurizing pump. It is preferable that the chamber 123 is always maintained under reduced pressure. Then, the door 126 is opened, and the sections of the conveyor 121 at the stations "A" and "B" are operated to convey the object 11 to the chamber 124. Subsequently, the door 126 is closed and the inside of the chamber 124 is depressurized by the depressurizing pump.

After the chamber 124 is depressurized to a predetermined pressure, the door 127 is opened and the sections of the conveyor 121 at the stations "B" and "C" are operated to convey the object 11 into the chamber 123. After the object 11 is conveyed to the chamber 123, the door 127 is closed and the drying chamber 123 is hermetically sealed. While the microwaves are irradiated to the object 11 from the microwave generating units 122, the gas is introduced from the outside into the chamber 123 via the gas intake and the fan 130 is operated to generate the airflow around the object 11, thereby drying the object 11.

While the object 11 is dried in the chamber 123, the inside of the pressure recovery chamber 125 is depressurized to a predetermined pressure by the depressurizing pump with the door 129 closed. After completion of the drying of the object 11 in the chamber 123, the door 128 is opened, the sections of the conveyor 121 at the stations "C" and "D" are operated to convey the object 11 to the chamber 125, and the door 128 is closed. Then, the operation of the depressurizing pump of the chamber 125 is stopped and the pressure in the chamber 125 is returned to near normal pressure (atmospheric pressure). Subsequently, the door 129 is opened and the sections of the conveyor 121 at the stations "D" and "E" are operated to discharge the object 11 to the station "E". After the object 11 is discharged from the chamber 125, it is preferable to depressurize the chamber 125 with the door 129 closed.

By repetition of the above-described operations, the objects 11 can be dried by the apparatus 120. Although the case of drying the single object 11 has been described, a plurality of the objects 11 can be dried by continuously conveying the objects 11 at predetermined intervals by the conveyor 121. Furthermore, the roller conveyor is used as the conveyor in the above embodiment, however, a belt conveyor or a chain conveyor capable of conveying the objects while sealing the chambers 123, 124 and 125 may be employed.

EMPIRICAL EXAMPLE 1

Figure 13:
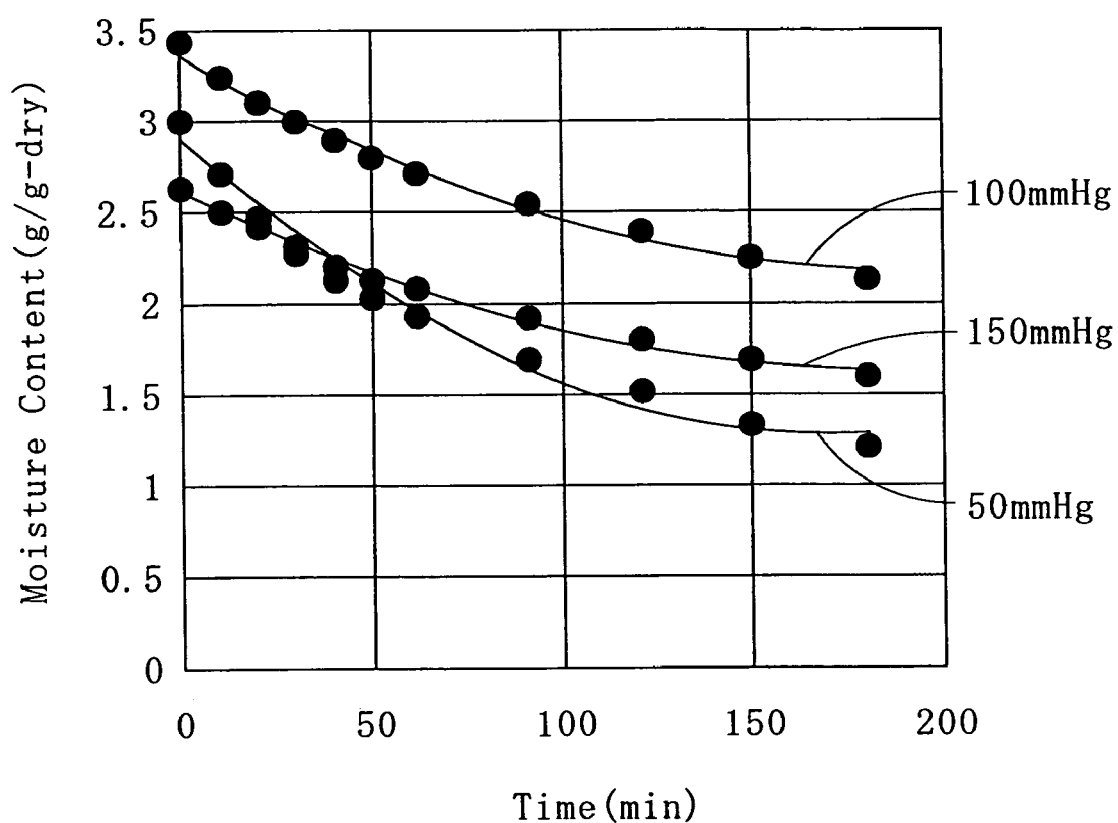
FIG. 13 is a graph showing the relationship between drying time and moisture contents of objects when a chamber of the apparatus for drying under reduced pressure using microwaves is maintained at different pressures.

The objects 11, the scallop adductor muscles, were dried by microwave irradiation using the apparatus 10 to which the method for drying under reduced pressure according to the first embodiment is applied. The flow-regulating valve 46 of the apparatus 10 was closed, and the open/close valve 37 and the pressure-regulating valve 39 were opened. The inside of the chamber 13 was depressurized to 50, 100 and 150 mmHg by the depressurizing pump 22. The specific temperatures "A" and "B" were set to 40° C. and 30° C., respectively. The objects 11 were heated and dried in the pulsing manner at respective pressures, and the moisture contents thereof were measured at predetermined times. The moisture content is a value calculated by dividing weight (g) of the water in the object by weight (g-dry) of the thoroughly dried object (the same is true in the following examples). As shown in FIG. 13, the lower the pressure in the chamber 13 was (50 mmHg), the larger the water reducing rate of the object became.

EMPIRICAL EXAMPLE 2

Figure 14:
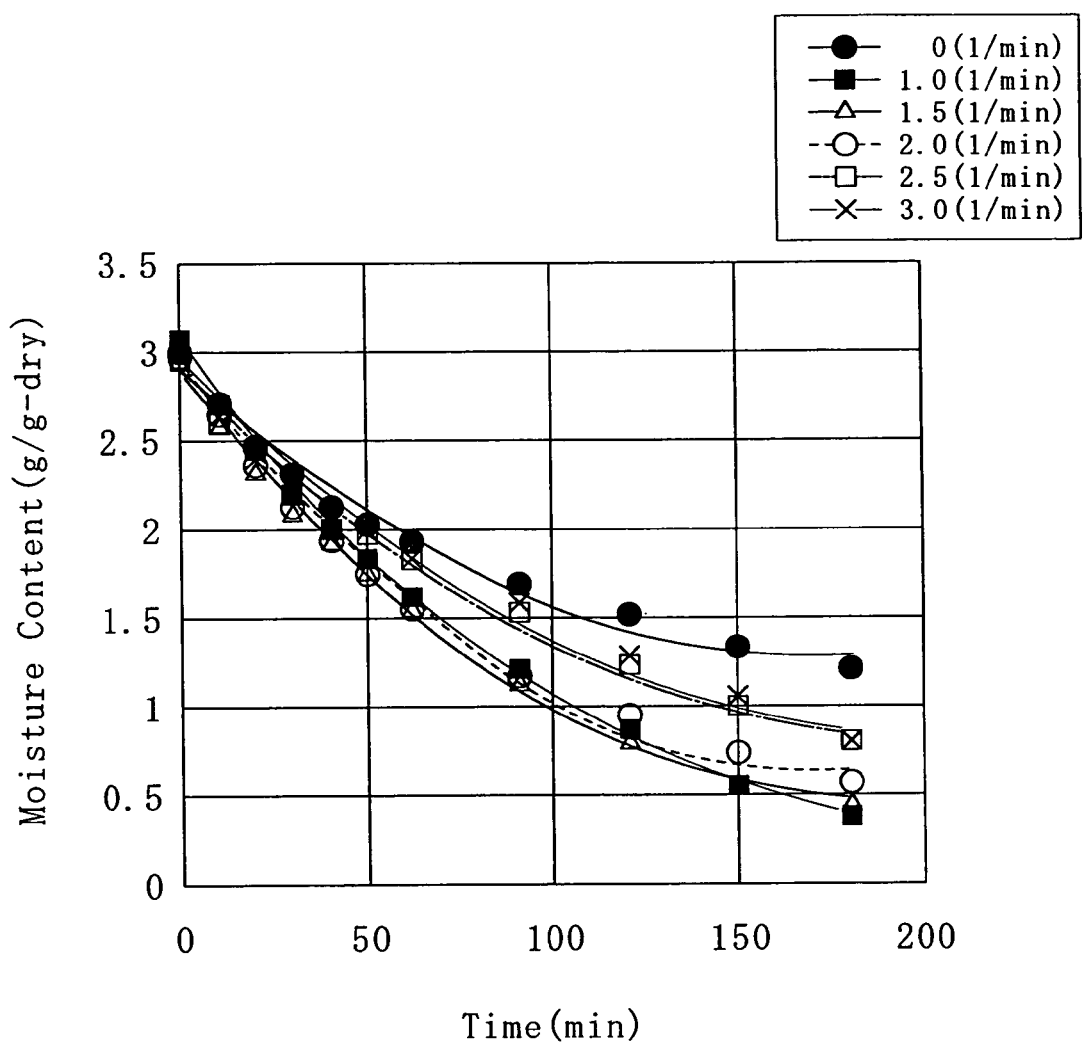
FIG. 14 is a graph showing the relationship between the drying time and the moisture contents of the objects when a gas is supplied to the chamber at different flow rates.

The objects 11, the scallop adductor muscles, were dried by microwave irradiation using the apparatus 10. The flow-regulating valve 46 of the apparatus 10 was opened, and the open/close valve 37 and the pressure-regulating valve 39 were opened. The inside of the chamber 13 was depressurized to 50 mmHg by the depressurizing pump 22. Flow rates of the air (an example of the gas) supplied into the chamber 13 were set to 0, 1.0, 1.5, 2.0, 2.5, and 3.0 L/min., and the specific temperatures "A" and "B" were set to 40° C. and 30° C., respectively. The objects 11 were heated and dried in the pulsing manner at respective air flow rates, and the moisture contents thereof were measured at predetermined times. The moisture content at the air flow rate of 0 L/min is the same as that in the Empirical Example 1. As shown in FIG. 14, the air supply into the chamber 13 improved drying efficiency. Furthermore, drying with the air supplied into the chamber 13 at the flow rates of 1.0 and 1.5 L/min showed better results.

EMPIRICAL EXAMPLE 3

Figure 15:
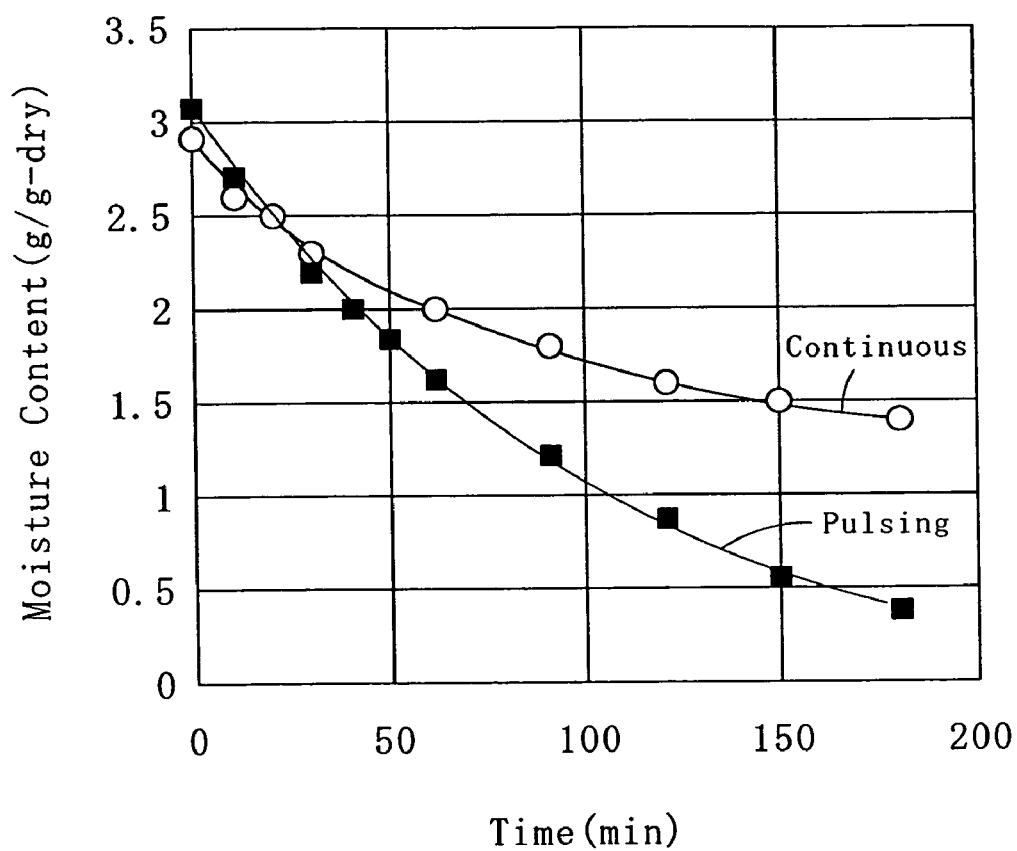
FIG. 15 is a graph showing the relationship between the drying time and the moisture contents of the objects when different microwave irradiation methods are employed.

The object 11, the scallop adductor muscle, was dried by microwave irradiation using the apparatus 10. The flow-regulating valve 46 of the apparatus 10 was opened, and the open/close valve 37 and the pressure-regulating valve 39 were opened. The inside of the chamber 13 was depressurized to 50 mmHg by the depressurizing pump 22. The flow rate of the air supplied into the chamber 13 was set to 1.0 L/min, and the object 11 was heated and dried in the pulsing manner (same as in the case of air flow rate of 1.0 L/min in the Empirical Example 2). As a comparative example, the object was dried under the same conditions except that the microwaves were irradiated continuously, and the moisture content of the object was measured at predetermined times. As shown in FIG. 15, when the microwaves were irradiated continuously, the drying time was longer and more electric power was used compared with the case where the microwaves were irradiated in the pulsing manner. Furthermore, because of the continuous microwave irradiation, the temperature of the object was elevated as high as 80 to 150° C., and the object turned black in some cases.

EMPIRICAL EXAMPLE 4

Figure 16:
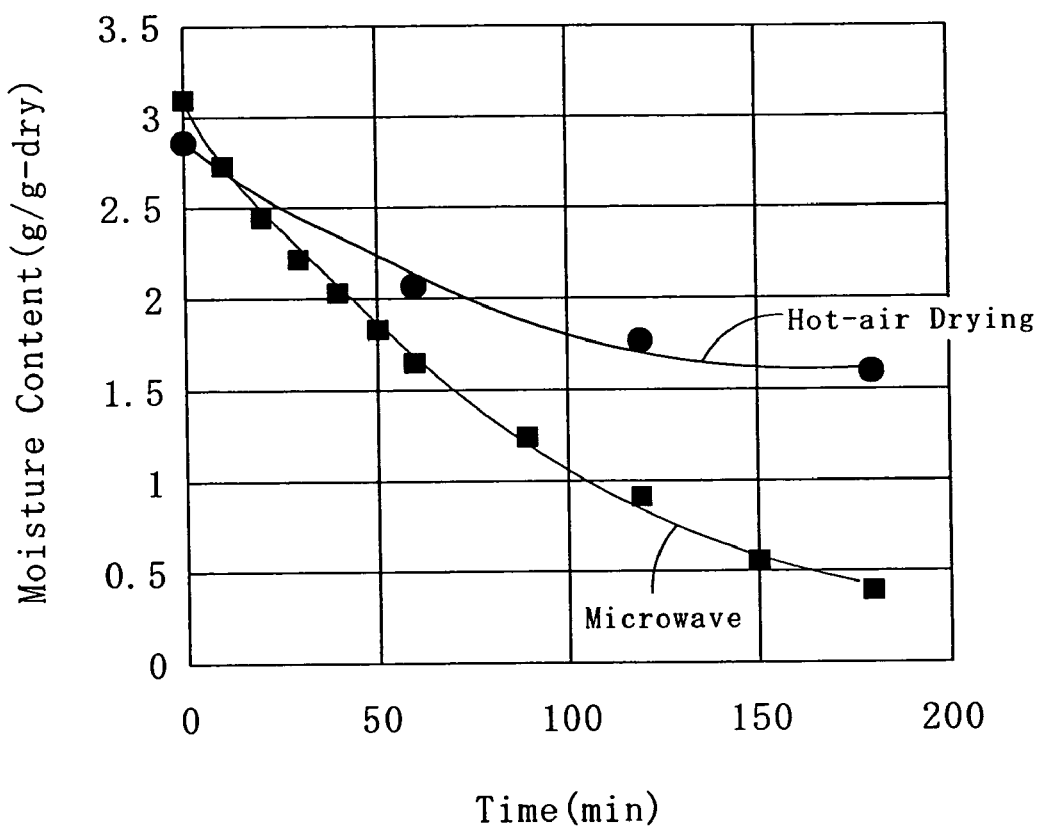
FIG. 16 is a graph showing the relationship between the drying time and the moisture contents of the objects for microwave drying and hot-air drying.

The object 11, the scallop adductor muscle, was dried by microwave irradiation using the apparatus 10. The flow-regulating valve 46 of the apparatus 10 was opened and the open/close valve 37 and the pressure-regulating valve 39 were opened. The inside of the chamber 13 was depressurized to 50 mmHg by the depressurizing pump 22. The flow rate of the air supplied into the chamber 13 was set to 1.0 L/min. The object 11 was heated and dried in the pulsing manner (same as in the case of the air flow rate of 1.0 L/min in the Empirical Example 2). As a comparative example, the object was dried using a dryer operable to dry the object by blowing hot air into a chamber housing the object. In the comparative example, the temperature and the flow rate of the hot air were set to 40° C. and 1.0 L/min, respectively. The chamber was open to the atmosphere and the inside of the chamber was at atmospheric pressure. As seen from FIG. 16, the drying method of the present invention achieved a faster drying speed compared with the drying method using hot air.

Figure 17:
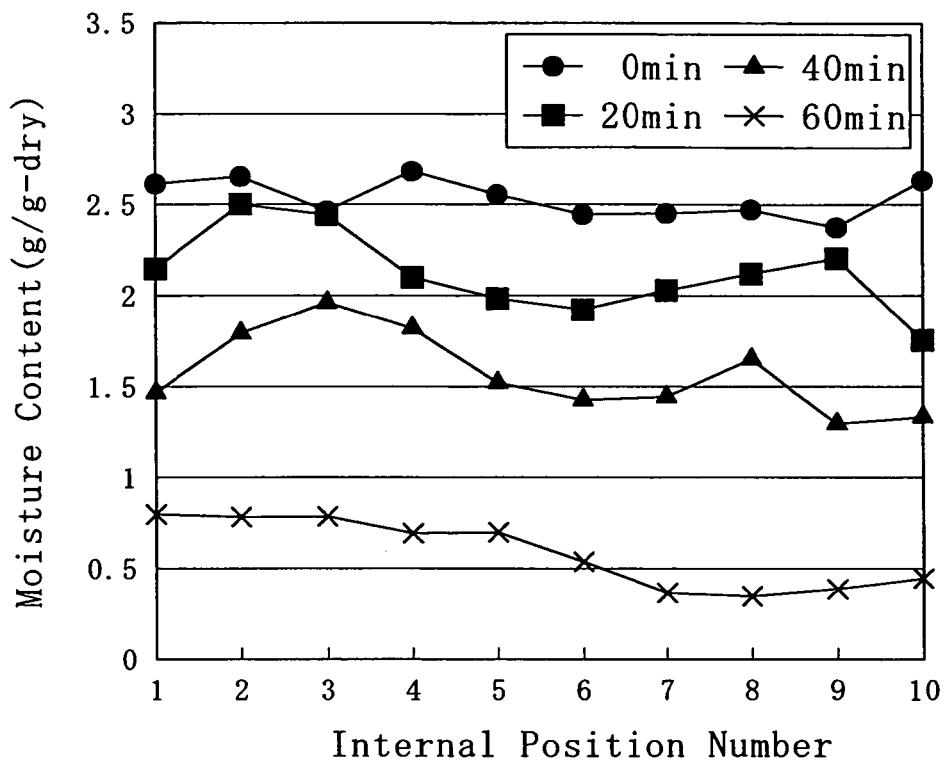
FIGS. 17 (A) and 17 (B) are graphs showing moisture content distributions from the surfaces to inner parts of the objects dried in an empirical example (microwave drying) and in a comparative example (hot-air drying), respectively.
Figure 17:
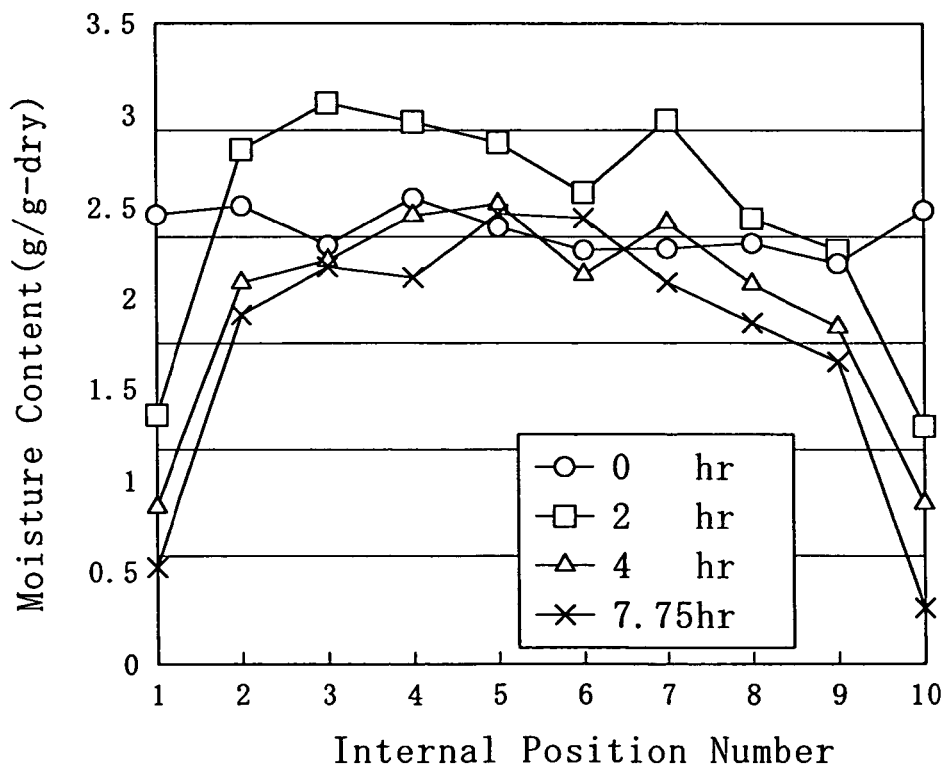

When drying the object 11 in Empirical Example 4, moisture contents on the surface and inside the object 11 were measured at prescribed times at the total of ten spots, dividing the object 11 (cross-sectional surface of the object 11) into nine equal parts from one surface to the other surface thereof. As seen from FIG. 17 (A), the object 11 was dried uniformly from the surfaces to the inner parts. Meanwhile, as shown in FIG. 17 (B), in the comparative example of hot-air drying where the moisture content was measured under the same conditions, it was found that although the parts near the surfaces of the object were dried, the inner parts of the object were less dried.

Figure 18:
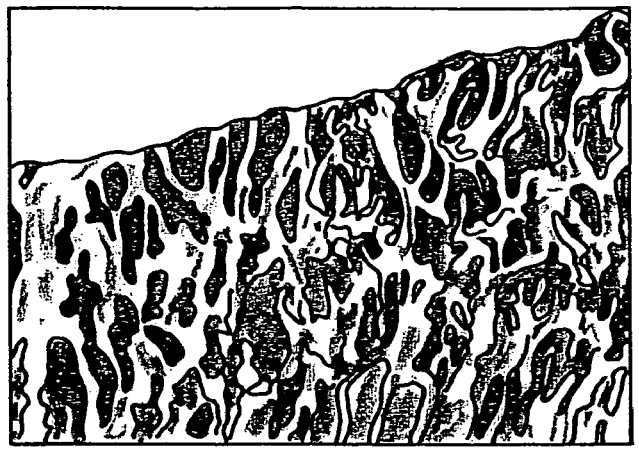
FIGS. 18 (A), 18 (B) and 18 (C) are explanatory diagrams illustrating surface tissue of the object before drying with microwaves, the surface tissue of the object after drying with microwaves, and the surface tissue of the object after drying in a comparative example, respectively.
Figure 18:
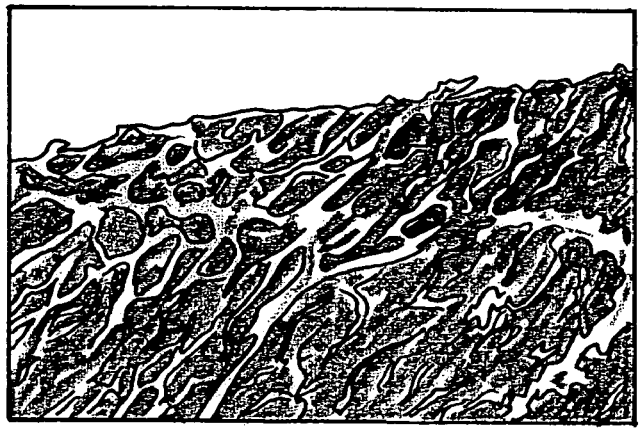
Figure 18:
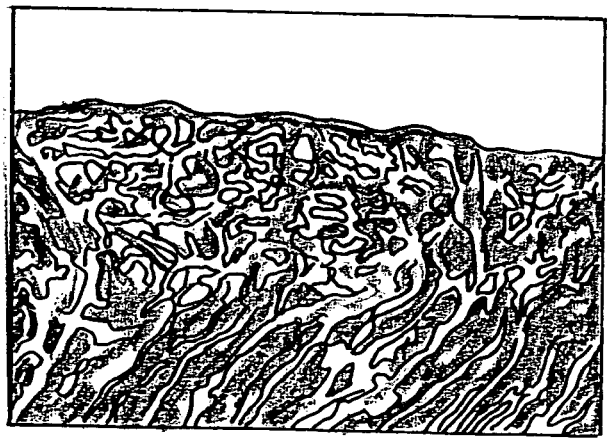

Surface tissue of the object 11 after drying in Empirical Example 4 was observed. FIGS. 18 (A) and 18 (B) respectively show tissue of the surface-layer cross-section of the object before and after drying. As evidenced by FIGS. 18 (A) and 18 (B), the surface tissue of the object 11 did not substantially change before and after drying, and even after drying, the surface tissue of the object 11 did not shrink and moisture passages thereof were maintained. Based on this result, it is understood that the apparatus and method of the present invention achieved a faster drying speed. In the drying method using hot air as the comparative example, however, it was found that the surface tissue of the object 11 was shrunk and dense, and moisture passages were not maintained, inhibiting removal of water in the object 11 and slowing down the drying speed.

While the embodiments of the present invention have been described, the present invention is not limited to these embodiments, and changes and modifications may be made without departing from the gist of the present invention. For example, the present invention includes a case where a part of or all of the embodiments or modifications are combined.

For example, in the above embodiments, a fan may be provided in the chamber for stirring the internal gas. Moreover, the microwaves may be irradiated by a microwave irradiating device such as a waveguide or an antenna.

INDUSTRIAL APPLICABILITY

According to the method and apparatus of the present invention, the object is dried by rapid heating in the pulsing manner by intermittently irradiating the microwaves to the object in a predetermined cycle while the upper limit temperature of the object in the depressurized chamber connected to the depressurizing pump is maintained at or below the specific temperature "A". As a result, the object can be dried in a short time at temperatures below the deterioration temperature of the object.

Furthermore, according to the present invention, the object can be rapidly dried without being deteriorated, and dried food can be produced with ease from shellfish, vegetables, fruits, meat, fish, etc. When the present invention is applied to drying of laundry, drying can be done in a short time without the cloth being damaged. When the present invention is used for drying lumber or electric equipment, rapid drying treatment can be conducted without damaging the inner part of the object.

The invention claimed is:

1. A method for drying under reduced pressure using microwaves, comprising:
    placing an object in a chamber connected to a depressurizing pump; and
    irradiating the microwaves to the object while maintaining an inside of the chamber under reduced pressure, wherein
    a) the inside of the chamber is depressurized to or below a saturated vapor pressure corresponding to a deterioration temperature of the object;
    b) a gas is supplied from an outside to the inside of the chamber;
    c) the object is dried while a temperature of the object is maintained below the deterioration temperature of the object by intermittent irradiation of the microwaves; and
    d) the gas is supplied from the outside to the inside of the chamber while the inside of the chamber is maintained under reduced pressure and an airflow is generated around the object, and
    wherein water evaporated from the object and the gas are discharged out of the chamber as an exhaust gas by the depressurizing pump to promote dehydration of the object, and
    the intermittent irradiation of the microwaves is controlled in a manner that the irradiation of the microwaves is stopped when the temperature of the object increases to a specific temperature "A", and subsequently, the irradiation of the microwaves is resumed when the temperature of the object lowers to a specific temperature "B", the specific temperature "A" being below the deterioration temperature of the object, the specific temperature "B" being in a vicinity of or higher than a saturation temperature corresponding to a pressure in the chamber.

2. The method for drying under reduced pressure using microwaves according to claim 1, wherein the object is food and the deterioration temperature is a denaturation temperature of constituents of the food.

3. The method for drying under reduced pressure using microwaves according to claim 1, wherein the object is a heat-deformable article and the deterioration temperature is a deformation temperature of the article.

4. An apparatus for drying under reduced pressure using microwaves, comprising:
    chambers for housing objects,
    wherein each chamber is designed to house an object;
    a depressurizing pump connected to one of the chambers and provided for depressurizing an inside of the chamber;
    a microwave irradiating device for irradiating the microwaves to the object in one of the chambers;
    an airflow generating device for generating an airflow around the object in one of the chambers by supplying a gas from an outside to the inside of one of the chambers under reduced pressure; and
    a control device for controlling intermittent irradiation of the microwaves in a manner that the microwaves are irradiated to the object from the microwave irradiating device in a predetermined cycle, thereby maintaining a temperature of the object below a deterioration temperature of the object,
    wherein each of the chambers is a lidded tray fixed on a carriage, the carriage running on endless rails intermittently, and the lidded tray is provided with an exhaust pipe connecting port to which an exhaust pipe coupled to the depressurizing pump is connected and with a gas induction pipe connecting port to which a blast pipe to be a part of the airflow generating device is connected.

5. The apparatus for drying under reduced pressure using microwaves according to claim 4, wherein a pair of detachable couplers each having a shutoff valve is provided in the middle of each of the exhaust pipe and the blast pipe.

6. The apparatus for drying under reduced pressure using microwaves according to claim 4, wherein the object is supplied into and discharged from the chamber by a conveyor, and a preliminary decompression chamber and a pressure recovery chamber are provided on an upstream side and a downstream side of the chamber, respectively.

7. The method for drying under reduced pressure using microwaves according to claim 1, wherein the exhaust gas discharged out of the chamber has a relative humidity of 95% or below.

* * * * *